US009340101B2

(12) United States Patent
Meißner et al.

(10) Patent No.: US 9,340,101 B2
(45) Date of Patent: May 17, 2016

(54) TRANSMISSION ARRANGEMENT AND DRIVE TRAIN FOR A HYBRID VEHICLE, AND HYBRID VEHICLE

(71) Applicant: VOLKSWAGEN AKTIENGESELLSCHAFT, Wolfsburg (DE)

(72) Inventors: Christian Meißner, Braunschweig (DE); Hendrik Schröder, Braunschweig (DE); Rainer Petersen, Wolfsburg (DE); Jörg Möckel, Sassenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/597,836

(22) Filed: Jan. 15, 2015

(65) Prior Publication Data
US 2015/0204424 A1 Jul. 23, 2015

(30) Foreign Application Priority Data

Jan. 23, 2014 (DE) .......................... 10 2014 201 254

(51) Int. Cl.
*F16H 3/72* (2006.01)
*B60K 6/48* (2007.10)
(Continued)

(52) U.S. Cl.
CPC . *B60K 6/48* (2013.01); *B60K 6/365* (2013.01); *B60K 6/387* (2013.01); *F16H 3/725* (2013.01); *B60K 2006/4816* (2013.01); *F16H 2200/2005* (2013.01); *F16H 2200/2023* (2013.01); *F16H 2200/2043* (2013.01); *F16H 2200/2094* (2013.01); *Y02T 10/6221* (2013.01); *Y02T 10/6256* (2013.01); *Y10S 903/919* (2013.01)

(58) Field of Classification Search
None
See application file for complete search history.

(56) References Cited

U.S. PATENT DOCUMENTS

| 6,344,008 B1 | 2/2002 | Nagano et al. | |
| 7,367,911 B2 * | 5/2008 | Raghavan | B60K 6/365 180/65.25 |
| 7,572,201 B2 * | 8/2009 | Supina | B60K 6/40 180/65.22 |

(Continued)

FOREIGN PATENT DOCUMENTS

DE   100 36 966 A1   4/2001
DE   10 2005 014 332 A1   9/2006

(Continued)

OTHER PUBLICATIONS

Search Report including Provisional Assessment of Patentability issued by the German Patent and Trademark Office for German Patent Application No. DE 10 2014 201 254.6, dated Oct. 8, 2014.

*Primary Examiner* — Dirk Wright
(74) *Attorney, Agent, or Firm* — Manfred Beck, P.A.

(57) ABSTRACT

A transmission arrangement for a hybrid vehicle includes an electric machine having a stator and a rotor. An electric-motor input shaft is connected to the rotor. A Ravigneaux gear set has a carrier, a set of long planets, a set of short planets, a ring gear, a first sun, and a second sun. The short planets mesh with the long planets. The ring gear meshes with the short planets and is connected to an output shaft. The first sun meshes with the short planets and is connected to the electric-motor input shaft. The second sun meshes with the long planets. The carrier is fixable on a transmission housing by a brake. The carrier, the second sun and an internal-combustion-engine input shaft are selectively couplable to one another in a torque-transmitting manner by a shiftable clutch arrangement. A hybrid vehicle and a drive train for a hybrid vehicle are also provided.

14 Claims, 10 Drawing Sheets

(51) Int. Cl.
    *B60K 6/365*     (2007.10)
    *B60K 6/387*     (2007.10)

(56) References Cited

U.S. PATENT DOCUMENTS 8,920,274 B2 * 12/2014 Scholz ................. F16H 37/065
                                            475/277

2007/0049444 A1     3/2007     Gumpoltsberger et al.

FOREIGN PATENT DOCUMENTS

| | | |
|---|---|---|
| DE | 10 2005 040 769 A1 | 3/2007 |
| DE | 10 2008 016 784 A1 | 10/2009 |
| EP | 2 472 144 A1 | 7/2012 |

* cited by examiner

TRANSMISSION ARRANGEMENT AND DRIVE TRAIN FOR A HYBRID VEHICLE, AND HYBRID VEHICLE

CROSS-REFERENCE TO RELATED APPLICATIONS

This application claims the priority, under 35 U.S.C. §119, of German Patent Application No. DE 10 2014 201 254.6, filed Jan. 23, 2014; the prior application is herewith incorporated by reference in its entirety.

BACKGROUND OF THE INVENTION

Field of the Invention

The invention relates to a transmission arrangement for a hybrid vehicle, including a transmission housing, an electric machine which is provided in the transmission housing and has a stator, which is mounted fixed relative to the transmission housing, and a rotatably mounted rotor, an electric-motor input shaft connected to the rotor, an internal-combustion-engine input shaft connectable to a crankshaft of an internal combustion engine, an output shaft connectable to an output of the motor vehicle. The transmission arrangement includes a Ravigneaux gear set with a carrier on which a set of long planets and a set of short planets meshing with the long planets are mounted rotatably, a ring gear which meshes with the short planets and is connected to the output shaft, a first sun which meshes with the short planets and is connected to the electric-motor input shaft and a second sun meshing with the long planets. The transmission arrangement further includes a brake, through the use of which the carrier is fixable on the transmission housing. The invention furthermore relates to a drive train for a hybrid vehicle with a transmission arrangement of this type. The invention also relates to a hybrid vehicle with a drive train of this type.

Transmission arrangements of this type are known from European Patent Application EP 2 472 144 A1.

Different drive concepts are known for realizing drive trains for hybrid vehicles partly driven by electric motor and partly by internal combustion engine. In particular, a differentiation is made on the basis of a serial, parallel or power-split hybrid concept. In modern vehicles, use is made of a combination of these concepts, wherein complex transmission structures provide the possibility for switching between different operating modes. Different driving states are generally assigned to different operating modes with only small overlap. In order to save on gearshift elements, it has proven advantageous in particular to substantially reduce the number of mechanical gears which can be realized and to span transmission gaps between the mechanical gears by electric or hybrid and frequently continuously variable operating modes.

The above mentioned document relating to a generic arrangement discloses a transmission arrangement of this type, but which requires two separate electric machines, which is disadvantageous with respect to the costs associated therewith and under weight aspects and installation space aspects.

German Patent Application DE 100 36 966 A1 discloses an alternative transmission arrangement which manages with a single electric machine. However, it is required here to connect a continuously variable transmission, in particular a bevel gear continuously variable transmission, upstream of the Ravigneaux gear set on the internal combustion engine side, which is likewise disadvantageous under cost, weight and installation space aspects,

SUMMARY OF THE INVENTION

It is accordingly an object of the invention to provide a transmission arrangement which overcomes the above-mentioned disadvantages of the heretofore-known transmission arrangements of this general type and which is improved with respect to the cost, installation space or package space and weight aspects. Another object of the invention is to provide a hybrid vehicle and a drive train for a hybrid vehicle.

With the foregoing and other objects in view there is provided, in accordance with the invention, a transmission arrangement for a hybrid vehicle, including:
  a transmission housing;
  an electric machine provided in the transmission housing, the electric machine having a stator fixed relative to the transmission housing and a rotatably mounted rotor;
  an electric-motor input shaft connected to the rotor;
  an internal-combustion-engine input shaft;
  an output shaft;
  a Ravigneaux gear set having a carrier, a set of long planets, a set of short planets, a ring gear, a first sun, and a second sun, the set of long planets and the set of short planets being mounted rotatably on the carrier, the short planets meshing with the long planets, the ring gear meshing with the short planets and being connected to the output shaft, the first sun meshing with the short planets and being connected to the electric-motor input shaft, the second sun meshing with the long planets;
  a (first) brake, the carrier being fixable on the transmission housing by the (first) brake; and
  a shiftable clutch arrangement, the carrier, the second sun and the internal-combustion-engine input shaft being selectively couplable to one another in a torque-transmitting manner by the shiftable clutch arrangement.

In other words, according to the invention, there is provided a transmission arrangement for a hybrid vehicle, including:
  a transmission housing;
  an electric machine which is provided in the transmission housing and has a stator, which is fixed relative to the transmission housing, and a rotatably mounted rotor;
  an electric-motor input shaft connected to the rotor;
  an internal-combustion-engine input shaft connectable to a crankshaft of an internal combustion engine;
  an output shaft connectable to an output of the motor vehicle;
  a Ravigneaux gear set with a carrier on which a set of long planets and a set of set of short planets meshing with the long planets are mounted rotatably, a ring gear which meshes with the short planets and is connected to the output shaft, a first sun which meshes with the short planets and is connected to the electric-motor input shaft, and a second sun meshing with the long planets;
  a first brake, through the use of which the carrier is fixable on the transmission housing; and
  a shiftable clutch arrangement, through the use of which the carrier, the second sun and the internal-combustion-engine input shaft are selectively couplable to one another in a torque-transmitting manner.

Preferred embodiments of the invention are the subject matter of the appended dependent claims.

Within the context of the present description, the terms "sun", "carrier" and "ring gear" are used in each case both for the actual transmission elements and for the corresponding shafts. A person skilled in the art will be able to gather specific meaning in the individual case from the corresponding context in each case.

As will be explained in more detail further below in the specific part of the description, six different operating modes can be realized with a transmission arrangement of this type, namely two purely electric operating modes, two mechanical gears which can be used purely by the internal combustion engine or in a parallel hybrid manner, and also two continuously variable regions, in which the step-up or transmission ratio between the internal combustion engine and the output can be varied continuously by corresponding adjustment of the electric machine.

In order to realize a first, purely electric operating mode, the first brake is activated, i.e. the carrier of the Ravigneaux gear set is fixed on the transmission housing, while the shiftable clutch arrangement is shifted in such a manner that a connection between the shafts coupled by the clutch arrangement, i.e. carrier, second sun and internal-combustion-engine input shaft, for conjoint rotation does not take place. In this state, the internal combustion engine is functionally decoupled. The Ravigneaux gear set, because of the secured carrier thereof, serves as a pure step-up stage between the electric machine and the output shaft.

A second, purely electric operating mode is realized by an open first brake and a shifting configuration of the shiftable clutch arrangement, in which the carrier and the second sun are connected to each other for conjoint rotation. Owing to the coupling of two of the shafts thereof, the Ravigneaux gear set revolves here as a block, and therefore the torque of the electric machine is directly transmitted to the output shaft.

A first mechanical gear is realized by a closed first brake and a shifting configuration of the shiftable clutch arrangement, in which a torque of the internal combustion engine is transmitted to the second sun. The power flux from the internal combustion engine is introduced via this sun into the Ravigneaux gear set and is discharged via the carrier and ring gear thereof to the output shaft. At the same time, a torque of the electric machine can be administered in a parallel hybrid manner via the first sun. Owing to the negative rotational speed of the electric machine that is then present during forward travel, the mechanical gear can be electrically "boosted" in the event of a negative torque of the electric machine; in the event of a positive torque of the electric machine, this operating mode can be used for generating electrical energy.

A second mechanical gear is configured as a mechanical direct gear. In order to realize the latter, the first brake is opened, the shiftable clutch arrangement is in a shifting configuration, in which the internal-combustion-engine input shaft, the second sun and the carrier of the Ravigneaux gear set are coupled to one another. Owing to the coupling of two of the elements thereof, namely the second sun and the carrier, the Ravigneaux gear set revolves as a block. The torque of the internal combustion engine is transmitted directly to the output shaft. In addition, a torque of the electric machine can be administered in a parallel hybrid manner via the first sun.

A first continuously variable operating mode, the step-up region of which is preferably arranged between that of the first mechanical gear and that of the second mechanical gear, can be realized by an open first brake and a shifting configuration of the shiftable clutch arrangement, in which the internal-combustion-engine input shaft is coupled to the second sun in a torque-transmitting manner. The first continuously variable operating mode therefore differs with respect to the shifting positions of the gearshift elements from the first mechanical gear merely through the use of the open first brake. The effect achieved by this is that the carrier of the Ravigneaux gear set is not fixed on the housing, and the step-up which the torque of the internal combustion engine, that is introduced via the second sun, undergoes in the Ravigneaux gear set is adjustable through the use of the torque of the electric machine that is applied in the Ravigneaux gear set via the first sun.

A second continuously variable operating mode, the step-up region of which is preferably arranged above that of the mechanical direct gear, is realized by an open first brake and a shifting configuration of the shiftable clutch arrangement, in which the internal-combustion-engine input shaft is coupled to the carrier of the Ravigneaux gear set in a torque-transmitting manner. In a different manner than in the first continuously variable operating mode, the torque of the internal combustion engine is not introduced into the Ravigneaux gear set via the second sun, but rather via the carrier. Furthermore, reference can be made to the above explanation regarding the first continuously variable operating mode.

According to a feature of the invention, the carrier is connected to an auxiliary shaft, wherein the (first) brake and the shiftable clutch arrangement engage on the auxiliary shaft.

As emerges from the above explanation, the carrier of the Ravigneaux gear set is an element which interacts both with the first brake and with the shiftable clutch arrangement. Since these are typically provided at different positions, in particular at different ends of the transmission arrangement, it is provided, in a preferred development of the invention, that the carrier is connected to an auxiliary shaft on which the first brake and the shiftable clutch arrangement engage. As preferably provided, the auxiliary shaft can be formed as a coaxial central shaft which crosses the transmission arrangement in the length thereof. The remaining shafts of the Ravigneaux gear set can be formed as hollow shafts engaging concentrically around the central shaft. The connection between carrier and auxiliary shaft is preferably direct, but can also take place via gear wheel stages.

According to a feature of the invention, the shiftable clutch arrangement includes a freewheel, the freewheel connects an engine-side section of the internal-combustion-engine input shaft and a transmission-side section of the internal-combustion-engine input shaft in a directionally selective manner; and the shiftable clutch arrangement includes two clutches, a first one of the two clutches couples the second sun and a second one of the two clutches couples the carrier, to the transmission-side section of the internal-combustion-engine input shaft in a shiftable manner.

Different variants are conceivable in order to realize the shiftable clutch arrangement. With regard to a maximum reduction in gearshift elements, the clutch arrangement can be realized by the fact that the clutch arrangement includes a freewheel which connects an engine-side and a transmission-side section of the internal-combustion-engine input shaft on a directionally selective basis, and two clutches, of which a first couples the second sun, and of which a second couples the carrier, to the transmission-side section of the internal-combustion-engine input shalt in a shiftable, i.e. controllable, manner.

However, as an alternative thereto and preferred in practice is a variant which is distinguished in that the shiftable clutch arrangement includes a first clutch, through the use of which the carrier and the second sun are couplable to each other for conjoint rotation, a second clutch, through the use of which the carrier and the internal-combustion-engine input shaft are couplable to each other for conjoint rotation, and a third clutch, through the use of which the second sun and the internal-combustion-engine input shaft are couplable to each other for conjoint rotation. In a different manner than in the case of the freewheel variant, the internal combustion engine here is completely decouplable from the transmission.

Thus, according to a feature of the invention, the shiftable clutch arrangement includes a first clutch, a second clutch, and a third clutch; the carrier and the second sun are couplable to one another for conjoint rotation by the first clutch; the carrier and the internal-combustion-engine input shaft are couplable to one another for conjoint rotation by the second clutch; and the second sun and the internal-combustion-engine input shaft are couplable to one another for conjoint rotation by the third clutch.

It is noted that the designation of individual gearshift elements as first, second or third clutch in the present context should always be understood functionally and not necessarily also structurally. In particular, in a preferred embodiment of the invention, it can be provided with respect to the shiftable clutch arrangement, that the first, the second and the third clutch are combined in a shiftable clutch unit with five shifting positions for coupling three gearshift shafts for conjoint rotation, wherein in a first shifting position, a first of the three gearshift shafts, namely the second sun, is coupled to a second of the three gearshift shafts, namely the auxiliary shaft, for conjoint rotation, in a second shifting position, the first gearshift shaft is coupled to a third of the three gearshift shafts, namely to the internal-combustion-engine input shaft, for conjoint rotation, in a third shifting position, all three gearshift shafts are coupled to one another for conjoint rotation, in a fourth shifting position, the second gearshift shaft is coupled to the third gearshift shaft for conjoint rotation, and in a neutral position, the three gearshift shafts are uncoupled from one another within the shiftable clutch unit.

Thus, according to a feature of the invention, an auxiliary shaft is provided, the carrier is connected to the auxiliary shaft, the brake and the shiftable clutch arrangement engages on the auxiliary shaft; the first, the second, and the third clutch of the shiftable clutch arrangement are combined in a shiftable clutch unit with five shifting positions for coupling three gearshift shafts for conjoint rotation; in a first shifting position, a first one of the three gearshift shafts, namely the second sun, is coupled to a second one of the three gearshift shafts, namely the auxiliary shaft, for conjoint rotation; in a second shifting position, the first one of the three gearshift shafts is coupled to a third one of the three gearshift shafts, namely the internal-combustion-engine input shaft, for conjoint rotation; in a third shifting position, all three of the three gearshift shafts are coupled to one another for conjoint rotation; in a fourth shifting position, a second one of the three gearshift shafts is coupled to the third one of the three gearshift shaft for conjoint rotation; and in a neutral position, the three gearshift shafts are uncoupled from one another within the shiftable clutch unit.

The combining of the three (functional) clutches in a (structural) clutch unit is particularly advantageous with regard to the required installation space. The five shifting positions can preferably be realized through the use of a single gearshift member which is movable successively into five different positions which in each case realize one of the abovementioned shifting positions. To the structural refinement of such a variant, it is preferably provided that the five shifting positions of the shiftable clutch unit are distinguished by different axial positions of a sliding sleeve which is mounted in an axially displaceable manner and so as to be rotationally decoupled with respect to the transmission housing and, depending on the shifting position, through the use of toothed engagement of an internal toothing, which has two axially spaced-apart axial regions, in external toothings of toothed bodies, which are arranged fixedly on the gearshift shafts, of which the first and the third are configured as hollow shafts, are spaced apart axially from each other and through which the second gearshift shaft passes coaxially, interacts in a coupling manner with the toothed bodies for conjoint rotation. Such a clutch unit is distinguished by a particularly small radial and axial installation space and by particularly simple activatability of the different shifting positions.

In other words, according to a feature of the invention, the shiftable clutch unit includes a sliding sleeve having an internal toothing with two axially spaced-apart axial regions; the shiftable clutch unit includes toothed bodies with respective external toothings, the toothed bodies are provided fixedly on the gearshift shafts; the first one and the third one of the three gearshift shafts are configured as hollow shafts and are spaced apart axially from one another, the second one of the three gearshift shafts passes coaxially through the first one and the third one of the three gearshift shafts; and the five shifting positions of the shiftable clutch unit are distinguished by different axial positions of the sliding sleeve, wherein the sliding sleeve is mounted in an axially displaceable manner and so as to be rotationally decoupled with respect to the transmission housing and, depending on a respective one of the shifting positions, by a toothed engagement of the internal toothing of the sliding sleeve in the external toothings of the toothed bodies interacts in a coupling manner with the toothed bodies for conjoint rotation.

The operating modes which can be realized through the use of the transmission arrangement according to the invention have been explained in detail further above. In particular, it has been made clear that the longest step-up, i.e. the overdrive region, is operable through the use of the second continuously variable operating mode. Specifically, the state of the longest step-up is realized when the rotor of the electric machine is stationary. The latter supports the Ravigneaux gear set, which acts as a pure step-up stage, by way of the first sun thereof. The supporting force required for this purpose has to be provided electrically, i.e. with energy consumption. In order to improve the efficiency of the transmission arrangement, it is provided, in a development of the invention, that a second brake is included, through the use of which the first sun, and therefore the rotor of the electric machine, is fixable on the transmission housing. Closing of the second brake therefore results in a mechanical support of the first sun and of the rotor, and therefore the abovementioned overdrive state can be realized without electric power, i.e. as a third mechanical gear. This gear differs from the second continuously variable operating mode described in detail above merely by the closed second brake. Thus, according to another feature of the invention, the brake defined in the independent patent claims is a first brake; and a second brake is provided and the first sun is fixable on the transmission housing by the second brake.

As already explained above in conjunction with the clutches, the terms of the first and second brake should also be understood here first of all as being purely functional and not necessarily also structural. In principle, the two functional brakes can be realized as separate structural elements. However, it is preferably provided that the first and the second brake are combined in a shiftable brake unit with three shifting positions for coupling two brake shafts to the transmission housing in a manner fixed against relative rotation, wherein the transmission housing, in a first shifting position, is coupled to a first of the two brake shafts, namely the first sun in a manner fixed against relative rotation, in a second shifting position, is coupled to a second of the two brake shafts, namely the auxiliary shaft, in a manner fixed against relative rotation, and in a neutral position, is not coupled to either of the two brake shafts in a manner fixed against relative rotation.

In other words, according to a further feature of the invention, there is provided an auxiliary shaft, the carrier is connected to the auxiliary shaft, the first brake and the shiftable clutch arrangement engage on the auxiliary shaft; the first and the second brake are combined in a shiftable brake unit with three shifting positions including a first shifting position, a second shifting position, and a neutral position for coupling two brake shafts to the transmission housing in a manner fixed against relative rotation; in the first shifting position, the transmission housing is coupled, in a manner fixed against relative rotation, to a first one of the two brake shafts, namely the first sun; in the second shifting position, the transmission housing is coupled to a second one of the two brake shafts, namely the auxiliary shaft, in a manner fixed against relative rotation; and in the neutral position, the transmission housing is coupled to neither of the two brake shafts in a manner fixed against relative rotation.

Such a brake unit can be realized particularly advantageously structurally in that the three shifting positions of the shiftable brake unit are distinguished by different axial positions of a sliding sleeve which is coupled in a manner fixed against relative rotation and in an axially displaceable manner to the transmission housing, reaches radially through a hub, on which the brake shafts which are arranged so as to pass through each other coaxially, are mounted, and, depending on the shifting position, by toothed engagement of the external toothing thereof in an internal toothing of the first brake shaft, which is configured as a hollow shaft, interacts in a coupling manner with this first brake shaft in a manner fixed against relative rotation, or by toothed engagement of the internal toothing thereof in an external toothing of the second brake shaft, which is mounted within the first brake shaft, interacts in a coupling manner with this second brake shaft in a manner fixed against relative rotation, or does not interact in a coupling manner with either of the two brake shafts in a manner fixed against relative rotation. This structural refinement of the shiftable brake unit is distinguished by a particularly small radial and axial installation space requirement and by a particularly simple activation of only a single gearshift member.

Thus, according to a feature of the invention, a hub is provided; the two brake shafts are mounted on the hub and are disposed so as to pass through one another coaxially; a sliding sleeve is provided, the sliding sleeve is coupled fixed against relative rotation and in an axially displaceable manner to the transmission housing, the sliding sleeve reaches radially through the hub; the sliding sleeve has an external toothing and an internal toothing; the first one of the two brake shafts has an internal toothing and is configured as a hollow shaft; the second one of the two brake shafts has an external toothing and is mounted within the first one of the two brake shafts; and the three shifting positions of the shiftable brake unit are distinguished by different axial positions of the sliding sleeve and, depending on respective ones of the shifting positions, through a toothed engagement of the external toothing of the sliding sleeve in the internal toothing of the first one of the two brake shafts, the sliding sleeve interacts in a coupling manner with the first one of the two brake shafts in a manner fixed against relative rotation, or through a toothed engagement of the internal toothing of the sliding sleeve in the external toothing of the second one of the two brake shafts, the sliding sleeve interacts in a coupling manner with the second one of the two brake shafts in a manner fixed against relative rotation, or the sliding sleeve does not interact in a coupling manner with either of the two brake shafts in a manner fixed against relative rotation.

Depending on the configuration of the internal combustion engine and the output adjoining the transmission arrangement according to the invention, it may be advantageous if the ring gear of the Ravigneaux gear set is not connected to the output shaft directly, but rather via an intermediate step-up stage. This can involve a single gearwheel stage; however, with regard to the radial installation space requirement and the axial installation space which is present in any case, it appears more advantageous in many cases if the intermediate step-up stage includes a countershaft.

The radial installation space of the electric machine is substantially determined by the efficiency or performance thereof. This in turn is determined by the relevant specifications for the corresponding vehicle segment. In this respect, a person skilled in the art has little scope with regard to the radial minimum installation space of the transmission arrangement according to the invention. In order not to have to exceed the minimum installation space requirement predetermined by the configuration of the electric machine, it is provided, in a preferred refinement of the invention, that the Ravigneaux gear set is arranged coaxially within the electric machine. The rotor of this machine provides sufficient space both in the axial direction and in the radial direction for receiving this core piece of the transmission arrangement according to the invention. Thus according to a feature of the invention, the Ravigneaux gear set is disposed coaxially within the electric machine.

According to another feature of the invention, the internal-combustion-engine input shaft is configured to be connectable to a crankshaft of an internal combustion engine.

According to yet another feature of the invention, the output shaft is configured to be connectable to an output of a motor vehicle.

With the object of the invention in view, there is also provided, in accordance with the invention, a drive train for a hybrid vehicle, including:

an internal combustion engine having a crankshaft;
an output having a driven shaft;
a transmission arrangement including a transmission housing;
the transmission arrangement including an electric machine provided in the transmission housing, the electric machine having a stator fixed relative to the transmission housing and a rotatably mounted rotor;
the transmission arrangement including an electric-motor input shaft connected to the rotor;
the transmission arrangement including an internal-combustion-engine input shaft connectable to the crankshaft of the internal combustion engine;
the transmission arrangement including an output shaft connectable to the output;
the transmission arrangement including a Ravigneaux gear set having a carrier, a set of long planets, a set of short planets, a ring gear, a first sun, and a second sun, the set of long planets and the set of short planets being mounted rotatably on the carrier, the short planets meshing with the long planets, the ring gear meshing with the short planets and being connected to the output shaft, the first sun meshing with the short planets and being connected to the electric-motor input shaft, the second sun meshing with the long planets;
the transmission arrangement including a (first) brake, the carrier being fixable on the transmission housing by the (first) brake;

the transmission arrangement including a shiftable clutch arrangement, the carrier, the second sun and the internal-combustion-engine input shaft being selectively couplable to one another in a torque-transmitting manner by the shiftable clutch arrangement;

the crankshaft of the internal combustion engine being connected to the internal-combustion-engine input shaft of the transmission arrangement; and the driven shaft of the output being connected to the output shaft of the transmission arrangement.

With the objects of the invention in view, there is therefore provided a drive train for a hybrid vehicle, including an internal combustion engine, a transmission arrangement and an output, wherein the transmission arrangement is configured according to one of the embodiments described above, wherein a crankshaft of the internal combustion engine is connected to the internal-combustion-engine input shaft of the transmission arrangement and a driven shaft of the output is connected to the output shaft of the transmission arrangement.

With the object of the invention in view, there is furthermore provided, in accordance with the invention, a hybrid vehicle, including:

a drive train having an internal combustion engine with a crankshaft;

the drive train having an output with a driven shaft;

the drive train having a transmission arrangement with a transmission housing;

the transmission arrangement including an electric machine provided in the transmission housing, the electric machine having a stator fixed relative to the transmission housing and a rotatably mounted rotor;

the transmission arrangement including an electric-motor input shaft connected to the rotor;

the transmission arrangement including an internal-combustion-engine input shaft connectable to the crankshaft of the internal combustion engine;

the transmission arrangement including an output shaft connectable to the output;

the transmission arrangement including a Ravigneaux gear set having a carrier, a set of long planets, a set of short planets, a ring gear, a first sun, and a second sun, the set of long planets and the set of short planets being mounted rotatably on the carrier, the short planets meshing with the long planets, the ring gear meshing with the short planets and being connected to the output shaft, the first sun meshing with the short planets and being connected to the electric-motor input shaft, the second sun meshing with the long planets;

the transmission arrangement including a (first) brake, the carrier being fixable on the transmission housing by the (first) brake;

the transmission arrangement including a shiftable clutch arrangement, the carrier, the second sun and the internal-combustion-engine input shaft being selectively couplable to one another in a torque-transmitting manner by the shiftable clutch arrangement;

the crankshaft of the internal combustion engine being connected to the internal-combustion-engine input shaft of the transmission arrangement; and the driven shaft of the output being connected to the output shaft of the transmission arrangement.

Further features and advantages of the invention emerge from the specific description below and the drawings.

Other features which are considered as characteristic for the invention are set forth in the appended claims.

Although the invention is illustrated and described herein as embodied in a transmission arrangement, a drive train for a hybrid vehicle, and a hybrid vehicle it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
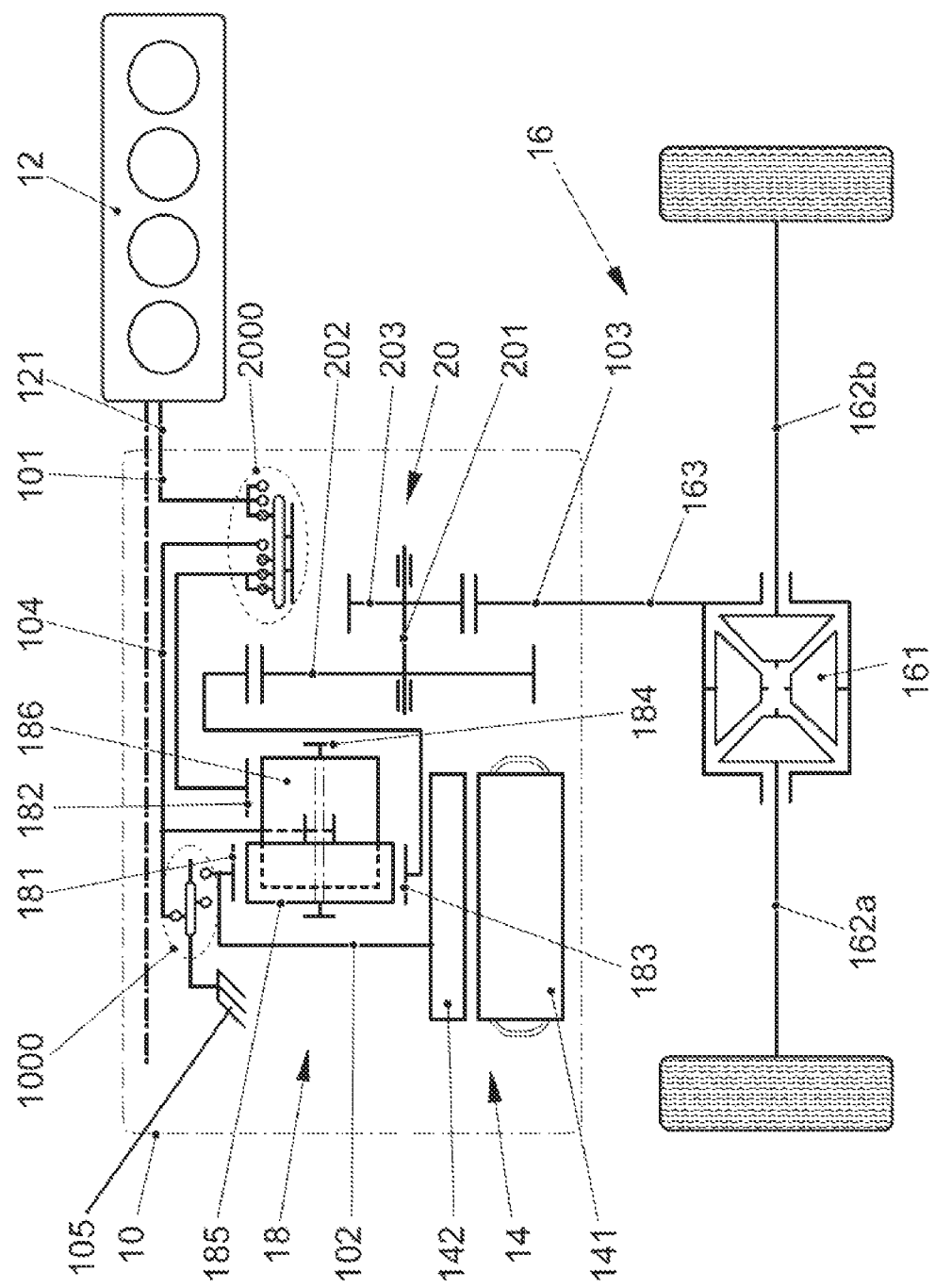
FIG. 1 is a schematic view illustrating an embodiment of the transmission arrangement according to the invention.

Referring now to the figures of the drawings in detail, in which the same reference numerals indicate the same or analogous elements, and first, particularly, to FIG. 1 thereof, there is shown a schematic illustration of a hybrid-vehicle drive train with a transmission arrangement 10 according to the invention. The drive train furthermore includes an internal combustion engine 12, the crankshaft 121 of which is connected to an internal-combustion-engine input shaft 101 of the transmission arrangement 10. The transmission arrangement 10 includes an electric machine 14 with a stator 141, which is fixed relative to the transmission housing 105, and a rotatably mounted rotor 142, the rotor shaft of which serves as an electric-motor input shaft 102 of the transmission arrangement 10. On the output side, an output 16, which includes in particular a differential 161 and two stub axles 162a, 162b, is connected by the driven shaft 163 thereof to the output shaft 103 of the transmission arrangement 10.

The core piece of the transmission arrangement 10 is a Ravigneaux gear set 18 with a first sun 181, a second sun 182, a ring gear 183 and a carrier 184, on which a set of short planets 185 and a set of long planets 186 are rotatably mounted. In a manner typical of Ravigneaux gear sets, the planet sets 185, 186 intermesh, and, in addition, the set of short planets 185 firstly meshes with the first sun 181 and the ring gear 183, and the set of long planets 186 meshes with the second sun 182. The first sun 181 is connected to the electric-motor input shaft 102. It also interacts with a shiftable brake unit 1000, which is described in more detail further below. The second sun 182 interacts with a shiftable clutch unit 2000, which is described in more detail further below. The carrier 184 is connected to an auxiliary shaft 104, the length of which passes as a coaxial central shaft through the transmission arrangement 10. The auxiliary shaft 104 interacts firstly with the shiftable brake unit 1000 and secondly with the shiftable clutch unit 2000. The internal-combustion-engine input shaft 101 also interacts with the clutch unit, which will be described in detail further below.

The ring gear 183 is connected to the output shaft 103 via a step-up stage 20, which is configured in particular in the manner of a countershaft 201.

Two functional brakes can be realized through the use of the shiftable brake unit 1000, namely, in particular, a first functional brake, with which the auxiliary shaft 104 is fixable on the transmission housing, and a second functional brake, with which the first sun 181 is fixable on the transmission housing. The two functional brakes are open in a neutral position of the shiftable brake unit 1000.

Different coupling states between the internal-combustion-engine input shaft 101, the second sun 182 and the auxiliary shaft 104 can be realized through the use of the shiftable clutch unit 2000. In particular, all three shafts can in each case be connected to one another in pairs, all three shafts can be connected simultaneously to one another, and there is a neutral position, in which there is no coupling between two of the shafts mentioned. Five shifting positions can therefore be realized through the use of the shiftable clutch unit.

The operating modes which can be realized by different shifting positions firstly of the shiftable brake unit 1000 and secondly by the shiftable clutch unit 2000 will be explained once again below with reference to FIGS. 2 to 8. For the sake of improved clarity, the reference numbers in FIGS. 2 to 8 have been omitted. However, the reference numbers can be taken without change from FIG. 1 for all of the elements. The electric motor power flux is shown here as a bold dashed arrow line, the power flux from the internal combustion engine is shown as a bold, chain-dotted arrow line. The respective torque support is shown as a bold continuous line.

Figure 2:
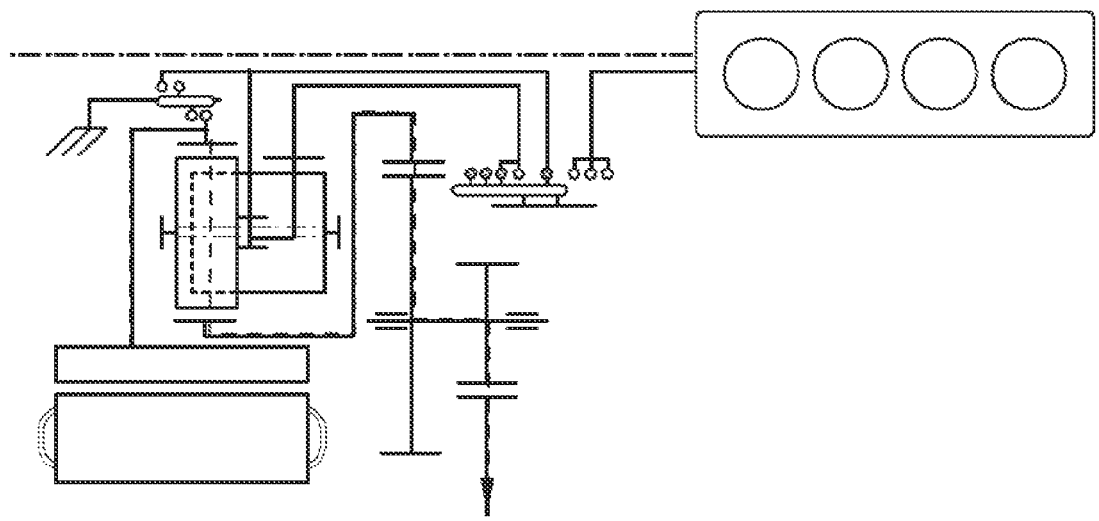
FIG. 2 is a schematic view illustrating the transmission arrangement of FIG. 1 in a first shifting configuration in accordance with the invention.

FIG. 2 shows the transmission arrangement according to the invention in a shifting configuration, also called a shifting constellation, which has been referred to above as the second electric operating mode. The shiftable clutch unit 2000 is in a shifting position A, in which a connection between the second sun 182 and the auxiliary shaft 103 for conjoint rotation is realized. The term conjoint rotation means that elements are fixed against relative rotation. At the same time, the shiftable brake unit 1000 is in the neutral position thereof, in which neither the auxiliary shaft 103 nor the first sun 181 is fixed on the transmission housing. The purely electrical power flux is introduced via the first sun 181 into the Ravigneaux gear set which, owing to the coupling of two of the elements thereof, namely the second sun 182 and the carrier 184 of the gear set, acts as a pure step-up stage. As in all of the other shifting configurations, the power flux is discharged via the ring gear 183 of the Ravigneaux gear set. The countershaft 201 of the step-up stage has a large pinion 202 which meshes with an external toothing of the ring gear 183. In addition, a small pinion 203 sits on the countershaft 201 for conjoint rotation. It meshes with a toothing of the output shaft 103. The step-up ratio realized by the step-up stage 20 is produced from the toothing ratio of large pinion 202 and small pinion 203 of the countershaft 201 to the output shaft 103.

Figure 3:
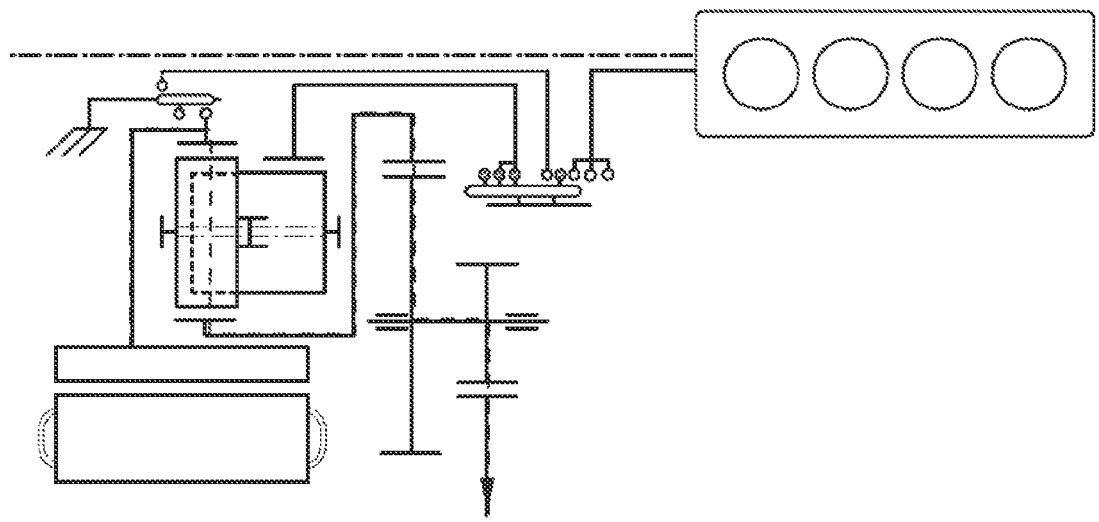
FIG. 3 is a schematic view illustrating the transmission arrangement of FIG. 1 in a second shifting configuration in accordance with the invention.

FIG. 3 shows the transmission arrangement according to the invention in a shifting configuration which has been referred to above as the first electric operating mode. The shiftable brake unit 1000 is shifted here in such a manner that the carrier 184 is fixed on the transmission housing. The shiftable clutch unit 2000 is in the shifting position B thereof, in which the three gearshift shafts thereof are uncoupled from one another. The electric motor power flux corresponds to that in the preceding shifting configuration, but the torque is supported against the transmission housing via the carrier.

Figure 4:
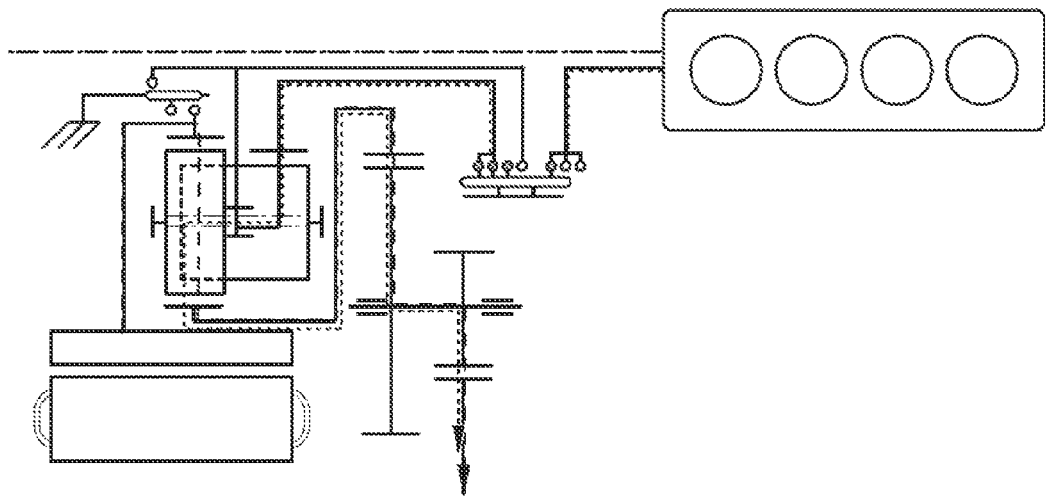
FIG. 4 is a schematic view illustrating the transmission arrangement of FIG. 1 in a third shifting configuration in accordance with the invention.

FIG. 4 shows the transmission arrangement according to the invention in a shifting configuration which has been referred to above as the first mechanical gear. The shifting position of the shiftable brake unit remains unchanged in relation to the previously described operating mode. By contrast, the shiftable clutch unit 2000 has been transferred into a shifting position C in which the second sun 182 is coupled to the internal-combustion-engine input shaft 101 for rotation therewith. In addition to the previously explained electric motor power flux and the torque support, a power flux of the internal combustion engine is therefore produced. The power flux is introduced into the Ravigneaux gear set via the second sun 182 and, like the electric motor power flux, discharged via the ring gear of the Ravigneaux gear set.

Figure 5:
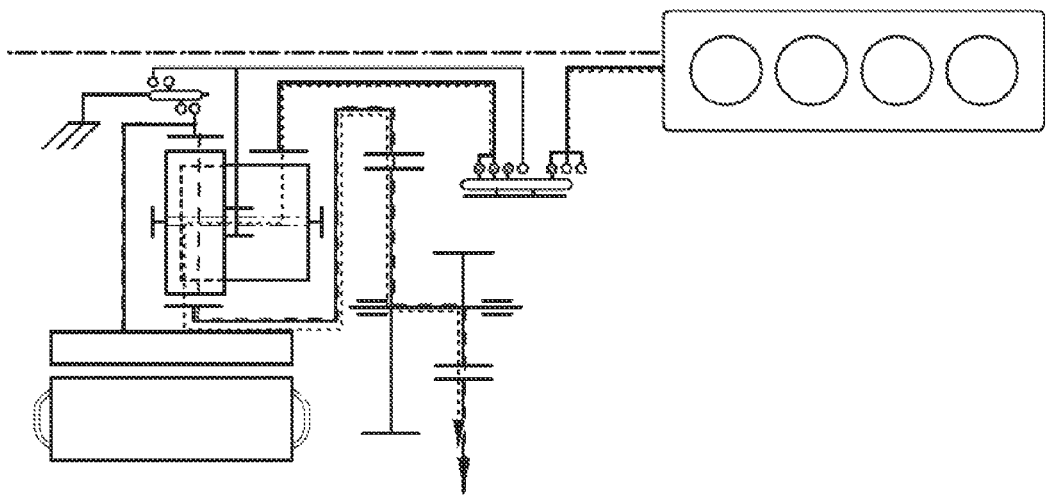
FIG. 5 is a schematic view illustrating the transmission arrangement of FIG. 1 in a fourth shifting configuration in accordance with the invention.

FIG. 5 shows the transmission arrangement according to the invention in a shifting configuration which has been referred to above as the first continuously variable operating mode. The shiftable brake unit is again in the neutral position thereof here. The shiftable clutch unit 2000 remains in the previously described shifting position C. The power fluxes of the electric motor and internal combustion engine therefore remain unchanged. Only a mechanical support of the torque is omitted, instead, a step-up variation which is continuously variably dependent on the rotation speed of the electric machine 14 is realized.

Figure 6:
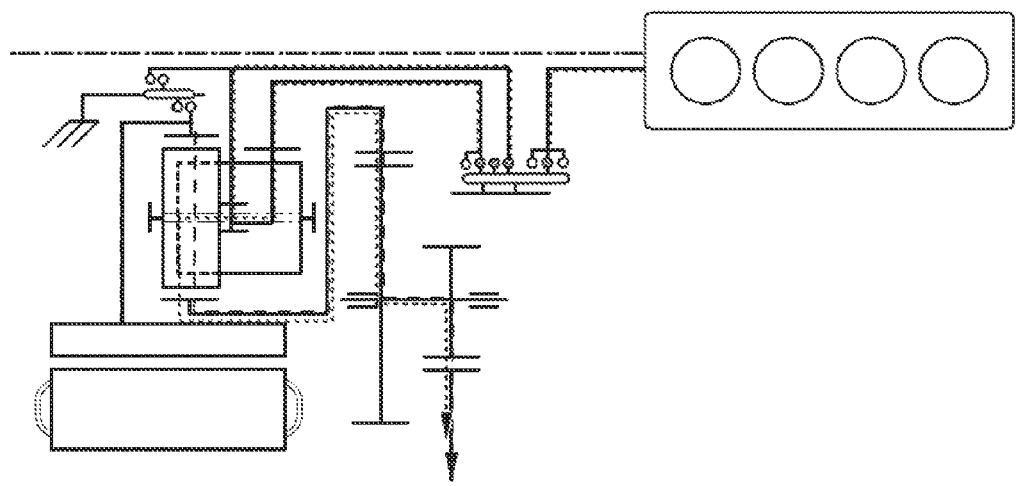
FIG. 6 is a schematic view illustrating the transmission arrangement of FIG. 1 in a fifth shifting configuration in accordance with the invention.

FIG. 6 shows the transmission arrangement according to the invention in a shifting configuration which has been referred to above as the second mechanical gear. The shiftable brake unit 1000 is also in the neutral position thereof in this shifting configuration. By contrast, the shiftable clutch unit 2000 is transferred into the shifting position D thereof, in which all three gearshift shafts thereof are coupled to one another for conjoint rotation. The power flux of the internal combustion engine is introduced here in parallel via the second sun 182 and the carrier 184 into the Ravigneaux gear set 18 which, owing to the coupling of the carrier 184 thereof to the second sun 182 thereof for conjoint rotation, revolves as a block. A mechanical direct gear is therefore realized which, as indicated by the power flux of the electric motor, can be supported in a parallel hybrid manner for boosting or recuperation purposes.

Figure 7:
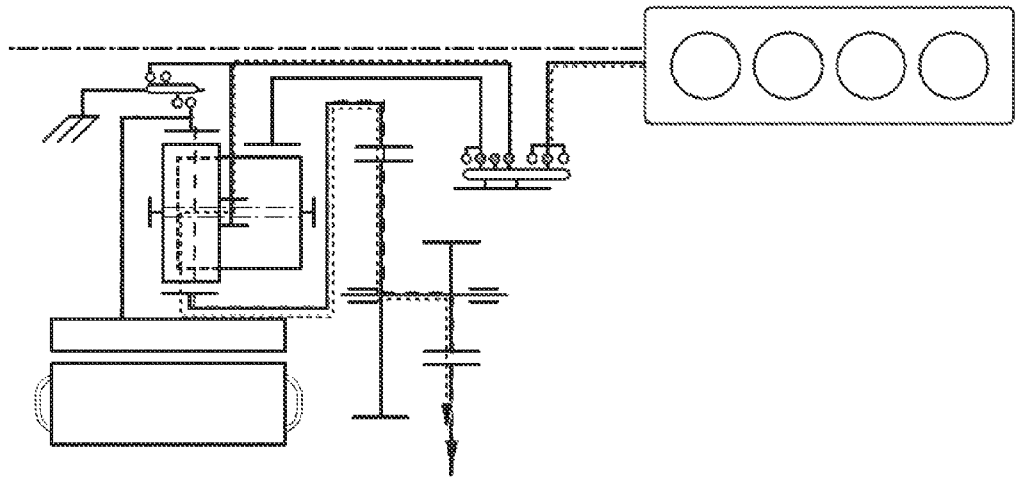
FIG. 7 is a schematic view illustrating the transmission arrangement of FIG. 1 in a sixth shifting configuration in accordance with the invention.

FIG. 7 shows the transmission arrangement according to the invention in a shifting configuration which has been referred to above as the second continuously variable operating mode. The shiftable brake unit 1000 is also in the neutral position thereof here. The shiftable clutch unit 2000 is in the shifting position E thereof, in which the internal-combustion-engine input shaft 101 is coupled to the carrier 184 for conjoint rotation. Accordingly, the power flux of the internal combustion engine is introduced into the Ravigneaux gear set 18 via the carrier 184. A continuously variable step-up variation is realized by introducing the power flux of the electric motor via the first sun 181.

Figure 8:
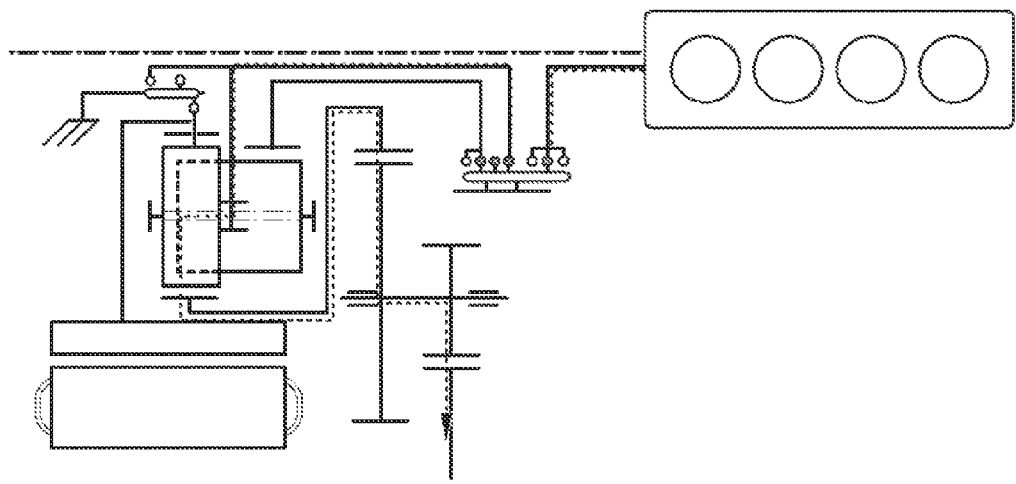
FIG. 8 is a schematic view illustrating the transmission arrangement of FIG. 1 in a seventh shifting configuration in accordance with the invention.

FIG. 8 shows the transmission arrangement according to the invention in a shifting configuration which has been referred to above as the third mechanical gear. That shifting configuration differs from the second continuously variable operating mode in that the shiftable brake unit 1000 has been transferred from the neutral position thereof into a position in which the brake unit fixes the first sun 181 and therefore the rotor 142 on the transmission housing. The support of the torque on the first sun 181 can therefore take place mechanically, i.e. without energizing the electric machine 14, as a result of which the gear, which is used in particular during rapid motorway journeys, is particularly efficient.

Of course, the embodiments which are discussed here and are shown in the figures merely constitute illustrative exemplary embodiments of the present invention. In light of the disclosure here, a wide range of variation possibilities is provided to a person skilled in the art. In particular, there are different possibilities for realizing the shiftable brake unit 1000 and the shiftable clutch unit 2000. These units can be configured as separately activatable, structural brakes and clutches or as integrated combination components. Particularly preferred embodiments of the last-mentioned variation will be described below.

Figure 9:
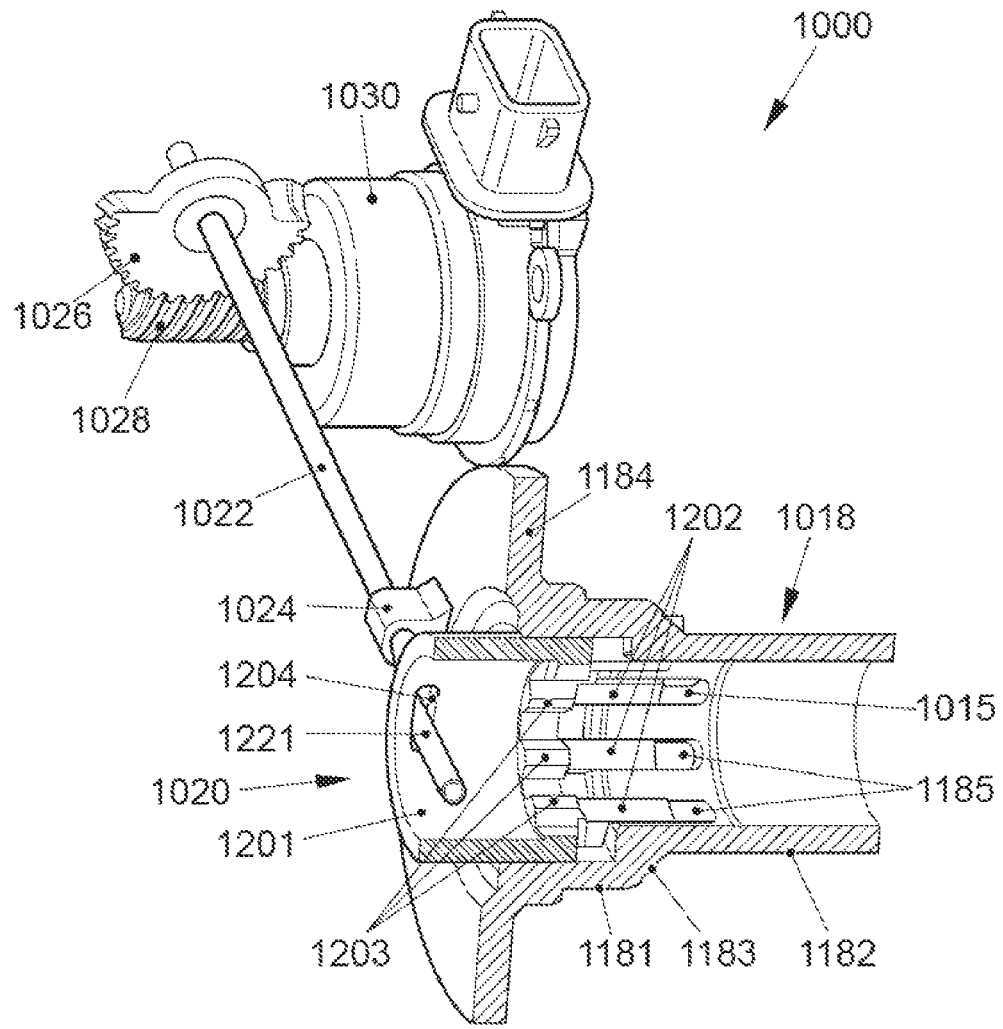
FIG. 9 is a partially sectional perspective view of a preferred embodiment of a shiftable brake unit in accordance with the invention.

FIG. 9 shows a perspective illustration of a preferred embodiment of a shiftable brake unit 1000 which is illustrated here without transmission housing and without brake shafts 1014, 1016, which are formed in particular by the first sun 181 and the auxiliary shaft 183. The arrangement thereof can be gathered from the schematic illustration of FIG. 10, which will be discussed in detail further below.

A central component of the shiftable brake 1000 is a hub 1018 which has a rear region 1181 of larger diameter and a front region of smaller diameter 1182. A transition region 1183, in which the hub 1018 is tapered, is arranged between the rear region 1181 and the front region 1182. A flange 1184 with which the hub 1018 can be flange-mounted on the transmission housing is arranged on the rear region 1181. The transition region 1183 and the rear part of the front region 1182 of the hub 1018 is provided with axially extending, slot-like radial apertures 1185.

A crown-like sliding sleeve 1020 is guided in the interior of the rear region 1181 of the hub 1018. The sliding sleeve has a sleeve body 1201, on the front edge of which a plurality of axially extending fingers 1202 are arranged. The fingers pass through the radial apertures 1185 in the transition region 1183 and are matched to the width of the radial apertures in the front region 1182 in such a manner that a linear guide with little play is realized. The material thickness of the fingers 1202 is larger at least in regions than the material thickness of the hub 1018 in the front region 1182 thereof, as can be seen in particular in FIG. 10. Inwardly projecting interior teeth 1203 are arranged in the interior of the sleeve body 1201 in a manner distributed over the circumference thereof.

In the vicinity of its rear edge, the sliding sleeve 1020 has an azimuthal slot 1204 in which a bent region 1221 of a rotation rod 1022 engages. The rotation rod 1022 is mounted in a radial bearing 1024, which is fixed on the flange 1184. The rotation rod 1022 is arranged substantially perpendicular to the axis of the hub 1018 and to the sliding sleeve 1020. At its end facing away from the hub 1018 and the sliding sleeve 1020, the rotation rod 1022 is connected to a worm wheel 1026 for rotation therewith, the worm wheel meshing with a worm 1028 which is driven by an electric motor 1030. Actuation of the electric motor 1030 results in rotation of the rotation rod 1022 and therefore in pivoting of the bent section 1221 thereof. The axial component (with respect to the hub 1018 and the sliding sleeve 1020) of the movement is transmitted via the azimuthal slot 1204 to the sliding sleeve 1020 such that the axial movement thereof results.

Figure 10A:
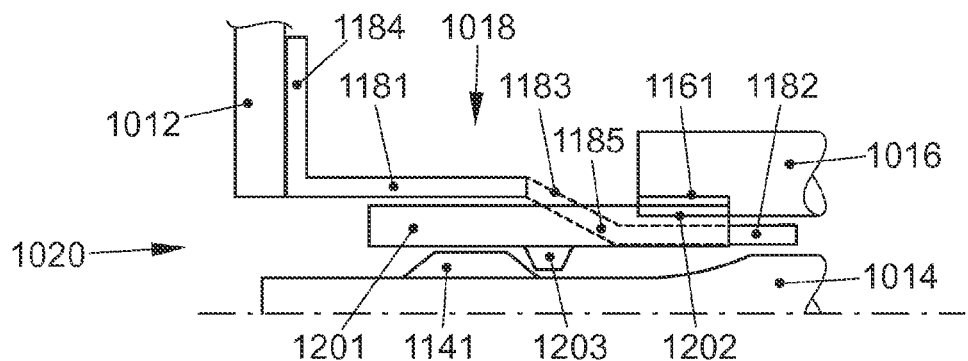
FIGS. 10a to 10d are diagrammatic views illustrating an embodiment of the shiftable brake unit of FIG. 9 in four shifting positions in accordance with the invention.

The function of the shiftable brake 1000 will be explained below with reference to FIGS. 10*a* to 10*d*. FIG. 10*a* illustrates a first sliding position of the sliding sleeve 1020, in which the fingers 1202, which reach through the slot-like radial apertures 1185 and form an external toothing of the sliding sleeve 1020, engage in a corresponding internal toothing 1161 of the external shaft 1016. A relative torque between the external shaft 1016 and the hub 1018, which is fixed on the base 1012, is transmitted via the lateral guide of the fingers 1202, which guide is formed by the radial apertures 1185. In this position, there is therefore a coupling between the external shaft 1016, i.e. here the first sun 181, and the hub 1018, consequently the transmission housing, in a manner fixed against relative rotation. The interior teeth 1203 which are arranged on the inside of the sleeve body 1201 are not in interaction in this sliding position with any element, in particular not with a corresponding external toothing 1141 of the internal shaft 1014, i.e. here the auxiliary shaft 183. This shifting position of the shiftable brake unit 1000 corresponds in the terminology of the above, general description to an open first and a closed second brake.

Figure 10B:
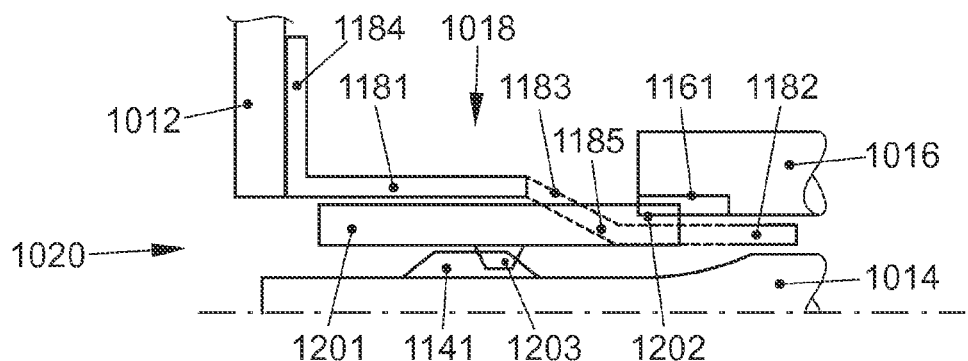

In the sliding position which is shown in FIG. 10*b* and in which the sliding sleeve 1020 is moved somewhat to the rear, i.e. to the left in FIG. 10, the fingers 1202 continue to engage in the internal toothing of the external shaft 1016. There is therefore no substantial change in this regard from the position of FIG. 10*a*. However, in this position, the internal teeth 1203 of the sliding sleeve 1020 engage in the external toothing 1141 of the internal shaft 1014, and therefore the latter is also connected to the hub 1018 and therefore to the transmission housing in a manner fixed against relative rotation in the position shown. This shifting position of the shiftable brake unit 1000 corresponds in the terminology of the above, general description at the same time to the closed first and second brake.

Figure 10C:
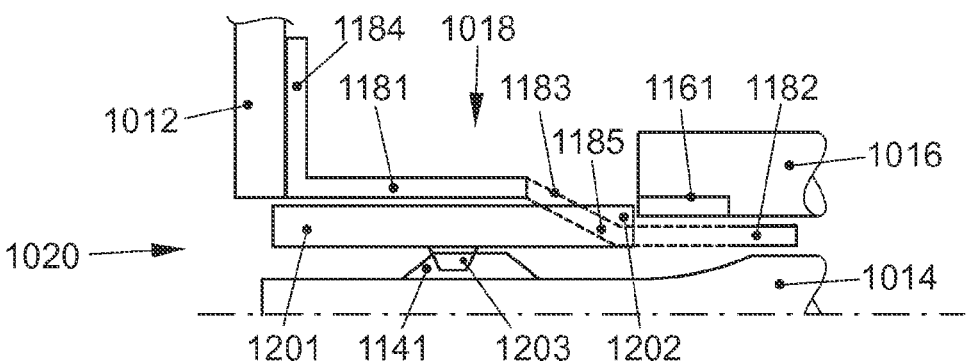

In the case of the sliding position which is shown in FIG. 10*c* and in which the sliding sleeve 1020 is moved even further to the rear, i.e. to the left in FIG. 10*c*, the fingers 1202 pass out of engagement with the internal toothing 1161 of the external shaft 1016. The coupling of the fingers to the hub 1018 and therefore to the transmission housing is therefore removed. However, a toothed engagement continues to remain between the internal teeth 1203 of the sliding sleeve 1020 and the external toothing 1141 of the internal shaft 1014. The latter is accordingly connected to the hub 1018 and therefore to the transmission housing in a manner fixed against relative rotation, as also in the previously described shifting position. This shifting position of the shiftable brake unit 1000 corresponds in the terminology of the above, general description to a closed first and an open second brake.

Figure 10D:
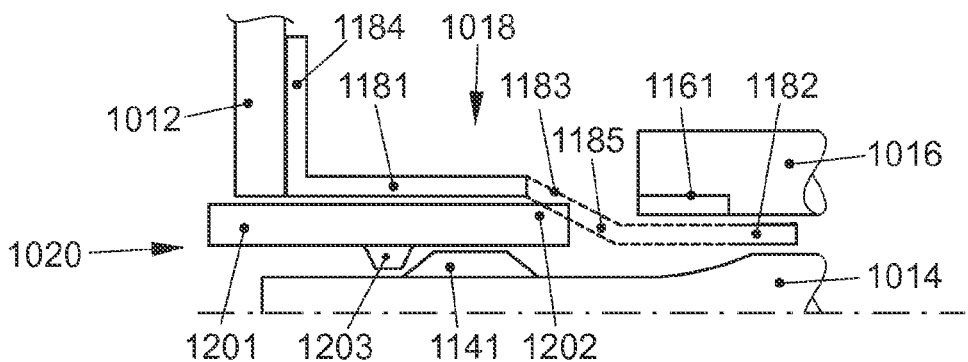

Finally, FIG. 10d shows a sliding position in which the sliding sleeve is moved even further to the rear, i.e. to the left in FIG. 10d. In this position, the internal teeth 1203 of the sliding sleeve 1020 now also pass out of engagement with the external toothing 1141 of the internal shaft 1014, and therefore, in this position, a coupling of any of the shafts 1014, 1016 with the hub and therefore with the transmission housing in a manner fixed against relative rotation is no longer provided. This shifting position of the shiftable brake unit 1000 corresponds in the terminology of the above, general description to a simultaneously open first and second brake, i.e. to the neutral position of the shiftable brake unit 1000.

Of course, the embodiments which are discussed here and are shown in the figures merely constitute illustrative exemplary embodiments of the shiftable brake unit 1000. In the light of the disclosure here, a wide range of variation possibilities is provided to a person skilled in the art. In particular, a coupling device which does not realize all of the shifting positions shown in FIG. 2 can be produced by configuring the toothings in a different manner. In particular, it will be easily possible for a person skilled in the art, for example by a narrower configuration of the external toothing 1141 of the internal shaft 1014, to avoid the simultaneous coupling, which is shown in FIG. 10b, of the two shafts 1014, 1016 to the hub 1018. The sliding actuation of the sliding sleeve 1020 can also take place in a different manner than shown in FIG. 9. This will be required in particular whenever the hub 1018 is not fixed on a fixed base, such as the transmission housing, but rather on a part which is itself movable, for example a third shaft.

Figure 11:
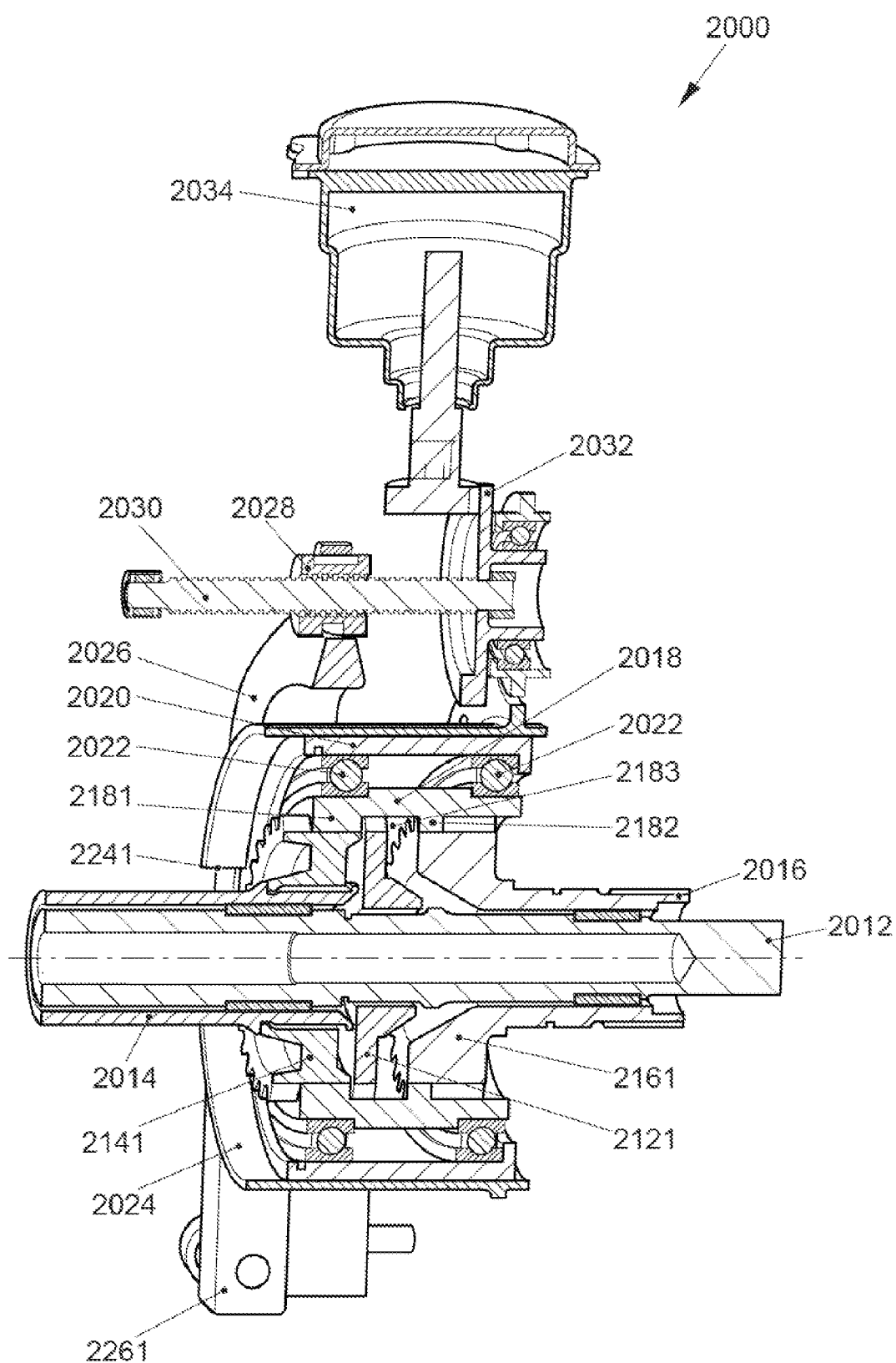
FIG. 11 is a sectional perspective view of a preferred embodiment of a shiftable clutch unit in accordance with the invention.

FIG. 11 shows a perspective illustration of a shiftable clutch unit 2000 which, in the embodiment illustrated, can adopt five shifting positions A, B, C, D and E which are shown in detail in the excerpt illustrations of FIGS. 12 to 16.

In the embodiment shown, the shiftable clutch unit 2000 serves for the optional coupling of three shafts, namely an internal shaft 2012, formed here in particular by the auxiliary shaft 183, a first external shaft 2014, formed here in particular by the second sun 182, and a second external shaft 2016, formed here in particular by the internal-combustion-engine input shaft 181. The internal shaft 2012 bears, as the first toothed body 2121, a spur gear which is mounted fixedly on the internal shaft 2012 through the use of a plug-in toothing. The first external shaft 2014 likewise bears, as the second toothed body 2141, a spur gear which is mounted fixedly on the external shaft through the use of a plug-in toothing. The third toothed body 2161, which is connected to the second external shaft 2016, is likewise configured as a spur gear, but is connected integrally to the external shaft 2016.

The first spur gear 2121 is arranged centrally, i.e. it is flanked axially by the two other spur gears 2141, 2161. In the illustration of FIG. 11, the second spur gear 2141 is arranged on the left, and the third spur gear 2161 on the right, of the first, central spur gear 2121. The external toothings of the spur gears 2121, 2141, 2161 are formed in an identical manner, i.e. they have the same tooth height and tooth width, wherein the teeth are aligned with one another in the axial direction. Spur toothings are preferably involved in each case.

In the embodiment shown, the spur gears 2121, 2141, 2161 are also coordinated with one another with respect to the axial width thereof and the arrangement thereof. In the embodiment shown, if the functional, axial space requirement of the first spur gear 2121 is defined as a reference width, the functional width of the second spur gear, which is arranged in the immediate vicinity of the first spur gear 2121, amounts to three reference widths. On the other side of the first spur gear 2121 there is a gap of one reference width. The gap is adjoined by the third spur gear 2161 which likewise has a functional width of three reference widths. The meaning of this specific adaptation of width and position is explained in more detail further below in conjunction with FIGS. 12 to 16, The spur gears 2121, 2141, 2161 He radially within a coaxially arranged sliding sleeve 2018 which has an internal toothing corresponding to the external toothing thereof. The internal toothing of the sliding sleeve 2018 is divided into two axial regions 2181, 2182 which are separated from each other by an axial toothing gap 2183. The internal diameter of the toothing gap 2183 is dimensioned in such a manner that, in the region of the gap, interaction between one of the spur gears 2121, 2141, 2161 and the sliding sleeve 2018 is not possible.

With reference to the above-defined reference width, the sliding sleeve 2018 is dimensioned in such a manner that the first toothing region 2181 thereof, which is illustrated on the left in FIG. 11, has a width of two reference widths. The toothing gap 2182 likewise has a width of two reference widths. The second toothing region 2182, which is illustrated on the right in FIG. 11, is one reference width wide. The meaning of the coordination of width and position within the sliding sleeve 2018 will be discussed in more detail further below in conjunction with FIGS. 12 to 16.

The sliding sleeve 2018 lies radially within an actuating sleeve 2020 against which the sliding sleeve is mounted through the use of two bearing rings 2022, which are preferably formed as angular ball bearings. The bearings 2022 ensure rotational decoupling between the sliding sleeve 2018 and the actuating sleeve 2020, with small axial forces, preferably within the range of approximately 1 kN, being transmittable.

The actuating sleeve 2020 lies radially within a guide sleeve 2024 against which the actuating sleeve is slidingly mounted in an axially displaceable manner. The guide sleeve 2024 can be fixedly connected to the transmission housing. Unless otherwise stated in an individual case, the guide sleeve forms the fixed reference point for all of the movements described here, The guide sleeve 2024 has an axially extending slot 2241 through which an extension (not visible in FIG. 11) of a pivot lever 2026 reaches. The extension is coupled to the actuating sleeve 2020 in a manner transmitting axial forces. The pivot lever 2026 is articulated at a pivot point 2261 which is fixed relative to the guide sleeve 2024. At its upper end in FIG. 11, the pivot lever bears a recirculation ball nut 2028 which is oriented in the axial direction and is mounted rotatably on an axially oriented and at bearing points which are fixed with respect to the guide sleeve 2024. The spindle 2030 undergoes a rotational drive via a contrate wheel gear 2032 by an electric motor 2034, which is preferably a precisely activatable servo motor.

When the servo motor 2034 is actuated, the spindle 2030 is therefore set into a rotational movement via the contrate wheel gear 2032, which causes an axial movement of the recirculation ball nut 2028. This axial movement causes the pivot lever 2026 to pivot about the pivot point 2261 thereof, which, in particular, results in a movement of the extension reaching through the slot 2241 in the guide sleeve 2024. The axial component of this movement is transmitted to the actuating sleeve 2020 which conducts the movement on to the sliding sleeve 2018 via the bearings 2022 which are capable of transmitting axial forces. A typically present relative rotation between sliding sleeve 2018 and actuating sleeve 2020 is decoupled by the bearings 2022. The toothed engagement configuration between the internal toothing of the sliding sleeve 2018 and the external toothings of the spur gears 2121, 2141 and 2161 is changed by moving the sliding sleeve 2018, as a result of which different couplings for conjoint rotation between the shafts 2012, 2014 and 2016 come about. The different toothed engagement configurations and the resulting couplings will be described below with reference to FIGS. 12 to 16.

Figure 12:
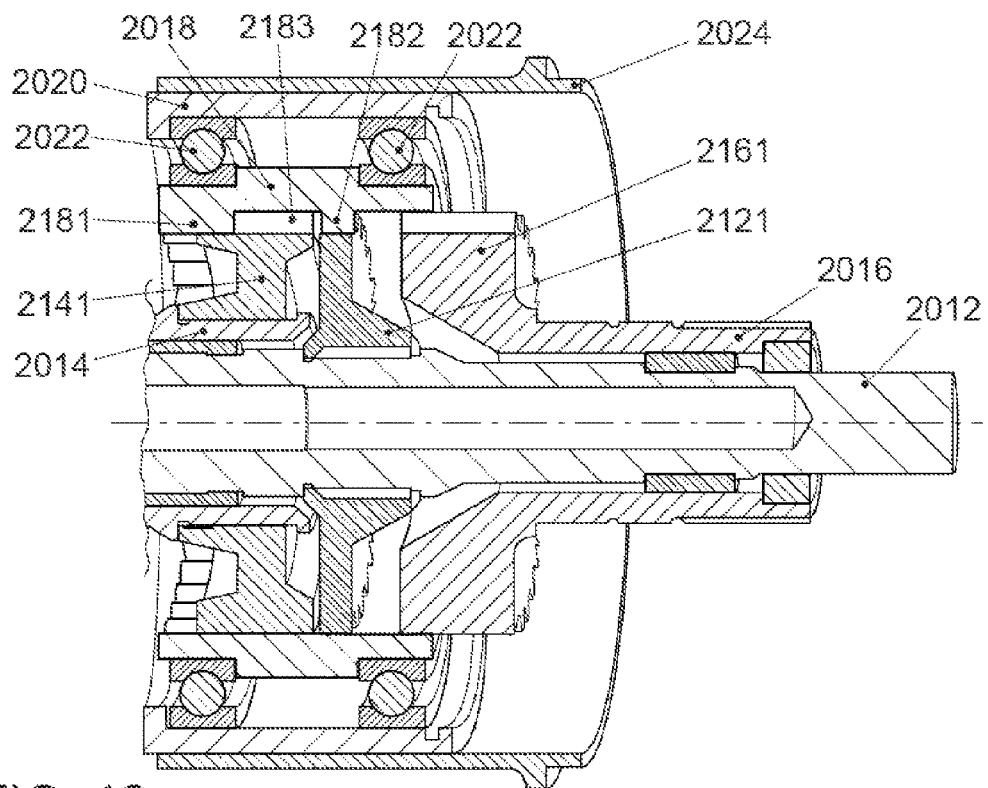
FIG. 12 is a sectional perspective view illustrating a shifting position A of the clutch unit of FIG. 10 in accordance with the invention.

FIG. 12 shows the sliding sleeve 2018 in the left end position thereof, i.e. in a sliding position A in which the sliding sleeve is moved maximally axially in the direction of the second spur gear 2141. In this position, the first toothing region 2181 of the sliding sleeve engages through the use of the axially inner partial section thereof, which makes up approximately half of the overall width of the first toothing section 2181, in the axially outer partial section of the external toothing of the second spur gear 2141, the width of which makes approximately one third of the overall width of the external toothing of the second spur gear 2141. In this position, the second toothing section 2182 of the sliding sleeve 2018 engages in the external toothing of the central, first spur gear 2121. An interaction between the sliding sleeve 2018 and the third spur gear 2161 does not exist in this position. The sliding sleeve 2018 therefore forms a coupling of the first and the second spur gear 2121, 2141, and therefore of the internal shaft 2012 with the first external shaft 2014, for conjoint rotation. The above-described second electric operating mode can be realized with the shiftable clutch unit in the sliding position A thereof and the shiftable brake unit 1000 in the neutral position thereof.

Figure 13:
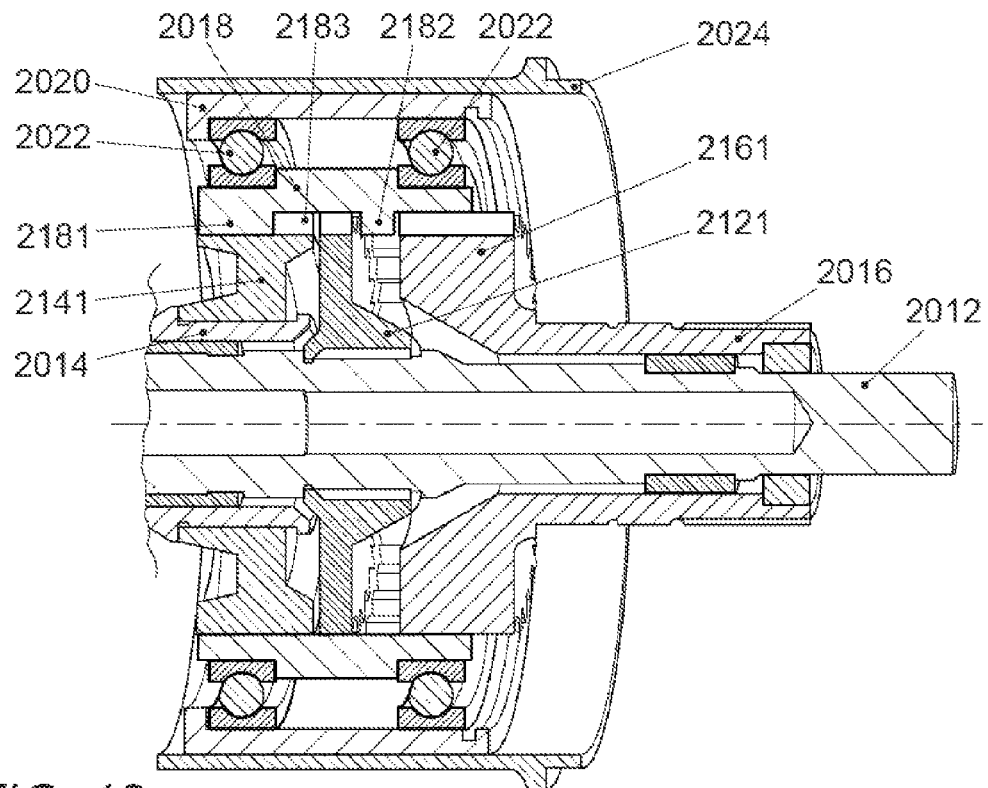
FIG. 13 is a sectional perspective view illustrating a shifting position B of the clutch unit of FIG. 10 in accordance with the invention.

In FIG. 13, the sliding sleeve 2018 is moved to the right by one reference width (sliding position B). Thus, the first toothing section 2181 of the sliding sleeve 2018 now engages over the entire width thereof in the external toothing of the second spur gear 2141. The second toothing region 2182 of the sliding sleeve 2018, which has the same functional width as the first spur gear 2121, namely one reference width, passes, however, through the use of this movement out of engagement with the external toothing of the first spur gear 2121. Instead, the second toothing section 2182 is located in this position B in the one reference width width gap between the first and the third spur gear 2121, 2161. In this position B, neither of these two spur gears 2121, 2161 is therefore coupled to the sliding sleeve 2018 or via the latter to the second spur gear 2141. The shafts 2012, 2014, 2016 are therefore completely decoupled in this state. The above-described, first electric operating mode can be realized with the shiftable clutch unit in the sliding position B thereof and with the shiftable brake unit 1000 in the shifting position thereof, which realizes a closed first and an open second brake.

Figure 14:
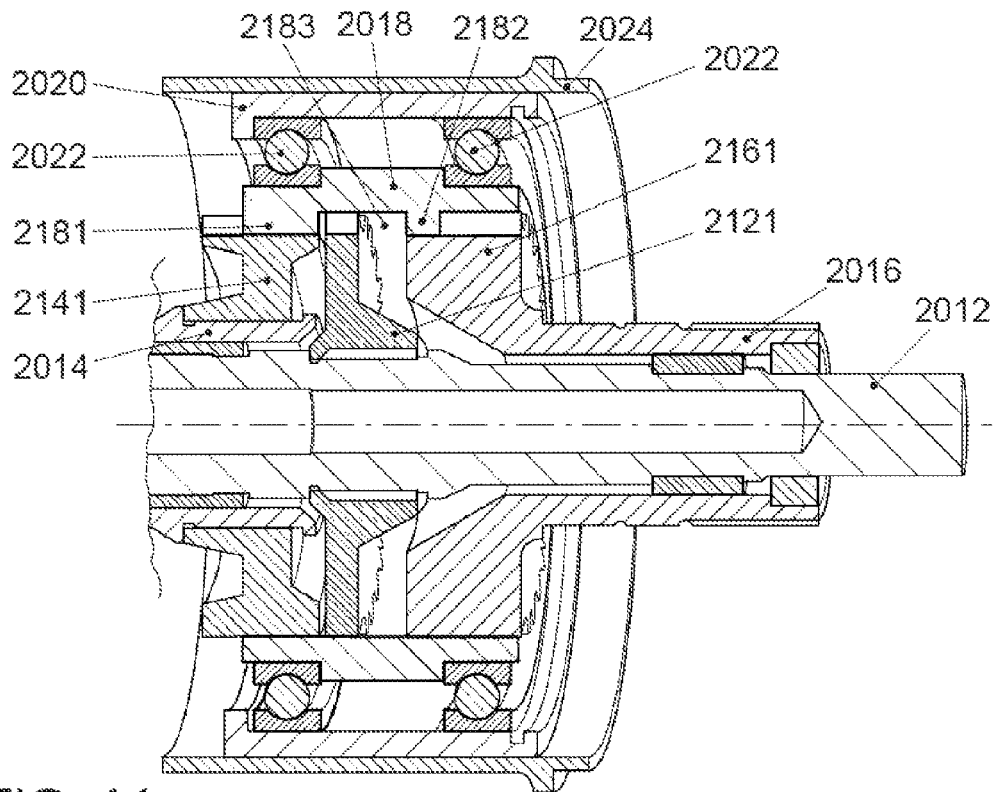
FIG. 14 is a sectional perspective view illustrating a shifting position C of the clutch unit of FIG. 10 in accordance with the invention.

In FIG. 14, the sliding sleeve 2018 is moved to the right by a further reference width (sliding position C). As before, the first toothing region 2181 of the sliding sleeve 2018 engages over the full width in the external toothing of the second spur gear 20141, wherein, in comparison to the previously described position in which the toothing region was positioned flush on the left, the toothing region is now positioned flush on the right. The second toothing region 2182 has now left the region of the gap between the first and the third spur gear 2121, 2161 and engages, in a positioning flush on the left, in the external toothing of the third spur gear 2161, the toothing region taking up approximately one third of the axial width of the external toothing. In this position C, the second and third spur gears 2141, 2161 are therefore coupled to each other via the sliding sleeve 2018 while the first spur gear 2121, which is located in the region of the toothing gap 2183, does not interact with the sliding sleeve 2018. This position C therefore represents a coupling of the two external shafts 2014, 2016. The above-described first mechanical gear can be realized with the shiftable clutch unit in the sliding position C thereof and with the shiftable brake unit 1000 in the shifting position thereof realizing a dosed first and an open second brake. By contrast, the first continuously variable operating mode can be realized together with the shiftable brake unit 1000 in the neutral position thereof.

Figure 15:
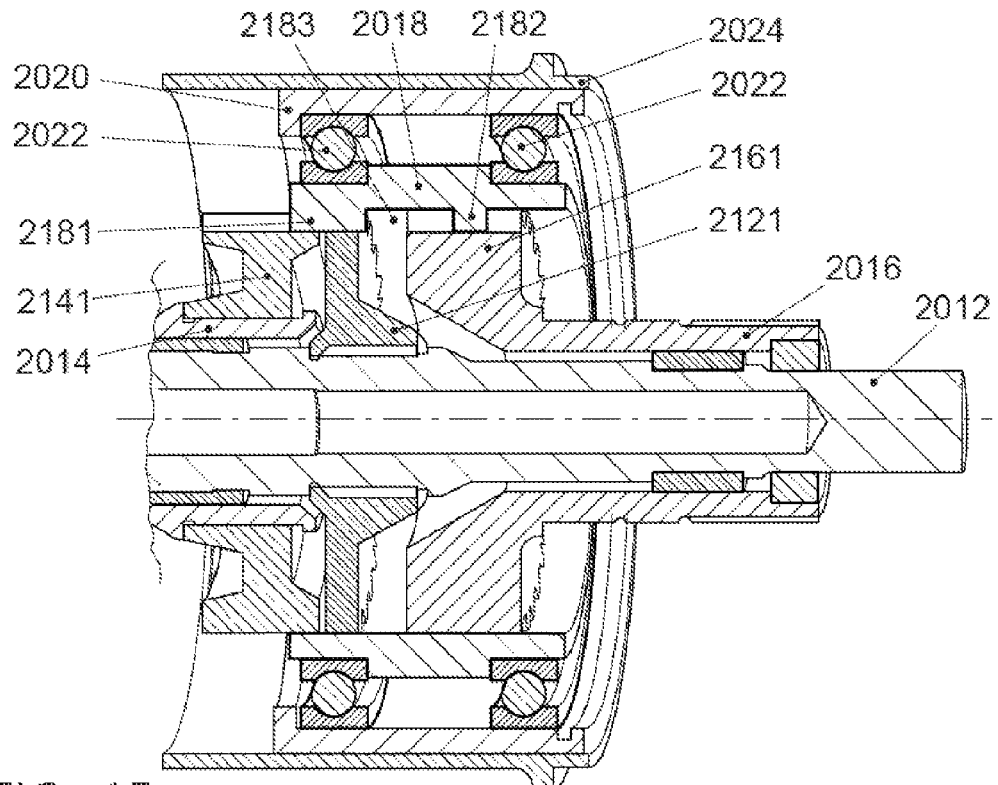
FIG. 15 is a sectional perspective view illustrating a shifting position D of the clutch unit of FIG. 10 in accordance with the invention.

In FIG. 15, the sliding sleeve 2018 is moved to the right by a further reference width (sliding position D). As before, the first toothing region 2181 of the sliding sleeve 2018 is in toothed engagement with the external toothing of the second spur gear 2141, but no longer with the full width of the sliding sleeve, but merely still with the left half thereof. In this position, the right half of the sliding sleeve engages in the external toothing of the first spur gear 2121. The second toothing region 2182 of the sliding sleeve 2018 undergoes a movement to the right within the external toothing of the third spur gear 2161, but this does not interrupt the interaction between the third spur gear 2161 and the sliding sleeve 2018. In this sliding position, all of the spur gears 2121, 2141, 2161 are therefore coupled to one another via the sliding sleeve 2018, and therefore the sliding position D shown represents a coupling of all of the shafts 2012, 2014, 2016 for conjoint rotation. The above-described, second mechanical gear can be realized with the shiftable clutch unit in the sliding position B thereof and the shiftable brake unit 2000 in the neutral position thereof.

Figure 16:
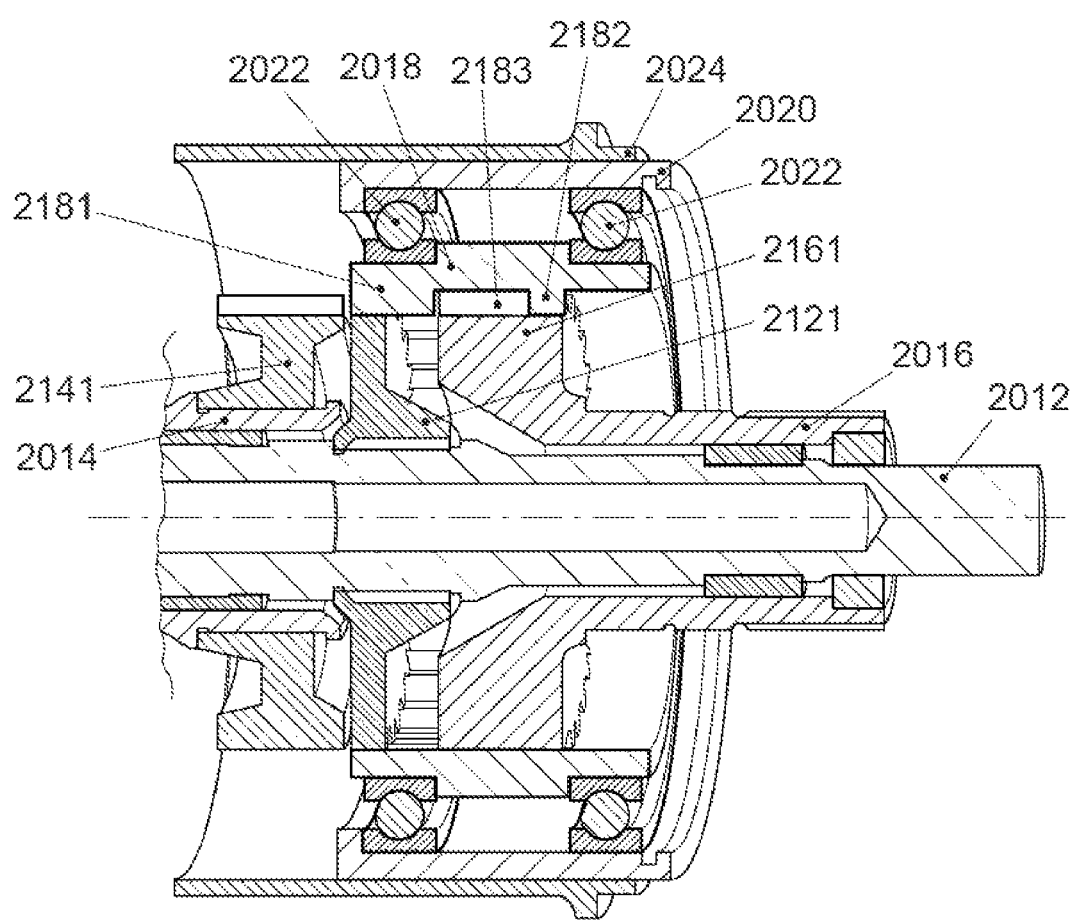
FIG. 16 is a sectional perspective view illustrating a shifting position E of the clutch unit of FIG. 10 in accordance with the invention.

In FIG. 16, finally, the sliding sleeve 2018 is moved by a further reference width into the end position E thereof maximally to the right. The first toothing region 2181 engages with the left partial region thereof in the external toothing of the first spur gear 2121 in a manner flush on the left. The right partial region of the toothing region projects into the gap between the first and third spur gears 2121, 2161. In this sliding position, the second toothing region 2182 of the sliding sleeve 2018 is in engagement with the external toothing of the third spur gear 2161 flush on the right. There is therefore a coupling of the first and third gear wheels 2121, 2161 via the sliding sleeve 2018 for conjoint rotation, while the second spur gear 2141 does not exhibit any interaction with the sliding sleeve 2018. This sliding position E therefore represents a coupling of the internal shaft 2012 with the second external shaft 2016. The above-described, second continuously variable operating mode can be realized with the shiftable clutch unit in the sliding position E thereof and with the shiftable brake unit 1000 in the neutral position thereof. By contrast, the above-described, third mechanical gear can be realized with the shiftable brake unit 1000 in the shifting position thereof realizing a dosed second and an open first brake.

Of course, the embodiments which are discussed here and are shown in the figures merely constitute illustrative exemplary embodiments of the shiftable clutch unit. In the light of the disclosure here, a broad spectrum of variation possibilities are provided to a person skilled in the art. In particular, a person skilled in the art will recognize that the definition of the reference width should not be understood in purely spatial terms, but rather also functionally in order to permit the above functionality. Of course, it is also possible to permit couplings between two shafts and a component, which is fixed relative to the housing, with such a clutch unit. In this case, just one of the shafts, preferably the internal shaft 2012, is to be replaced by the component fixed relative to the housing.

LIST OF REFERENCE NUMERALS 10 transmission arrangement
101 internal-combustion-engine input shaft 102 electric-motor input shaft
103 output shaft
104 auxiliary shaft
105 transmission housing
12 internal combustion engine
121 crankshaft of 12
14 electric machine
141 stator of 14
142 rotor of 14
16 output
161 differential
162a,b stub axles
163 driven shaft
18 Ravigneaux gear set
181 first sun of 18
182 second sun of 18
183 ring gear of 18
184 carrier of 18
185 short planets on 184
186 long planets on 184
20 step-up stage
201 countershaft
202 large pinion on 201
203 small pinion on 201
1000 shiftable brake unit
1014 internal shaft of 1000
1141 external toothing of 1014
1016 external shaft of 1000
1161 internal toothing of 1016
1018 hub
1181 rear region of 1018
1182 front region of 1018
1183 transition region between 1181 and 1182
1184 flange
1185 radial aperture
1020 sliding sleeve
1201 sleeve body
1202 finger
1203 internal teeth
1204 azimuthal slot
1022 rotation rod
1221 bent region of 1022
1024 radial bearing
1026 worm wheel
1028 worm
1030 electric motor
2000 shiftable clutch unit
2012 internal shaft of 2000
2121 first toothed body
2014 first external shaft of 2000
2141 second toothed body
2016 second external shaft of 2000
2161 third toothed body
2018 sliding sleeve
2181 first toothing region of 2018
2182 second toothing region of 2018
2183 toothing gap of 2018
2020 actuating sleeve
2022 bearing
2024 guide sleeve
2241 axial slot in 2024
2026 pivot lever
2261 pivot point of 2026
2028 recirculating ball nut
2030 spindle
2032 contrate wheel gear
2034 servo motor

What is claimed is:

1. A transmission arrangement for a hybrid vehicle, comprising:
   a transmission housing;
   an electric machine provided in said transmission housing, said electric machine having a stator fixed relative to said transmission housing and a rotatably mounted rotor;
   an electric-motor input shaft connected to said rotor;
   an internal-combustion-engine input shaft;
   an output shaft;
   a Ravigneaux gear set having a carrier, a set of long planets, a set of short planets, a ring gear, a first sun, and a second sun, said set of long planets and said set of short planets being mounted rotatably on said carrier, said short planets meshing with said long planets, said ring gear meshing with said short planets and being connected to said output shaft, said first sun meshing with said short planets and being connected to said electric-motor input shaft, said second sun meshing with said long planets;
   a brake, said carrier being fixable on said transmission housing by said brake; and
   a shiftable clutch arrangement, said carrier, said second sun and said internal-combustion-engine input shaft being selectively couplable to one another in a torque-transmitting manner by said shiftable clutch arrangement.

2. The transmission arrangement according to claim 1, including an auxiliary shaft, said carrier being connected to said auxiliary shaft, said brake and said shiftable clutch arrangement engaging on said auxiliary shaft.

3. The transmission arrangement according to claim 1, wherein:
   said shiftable clutch arrangement includes a first clutch, a second clutch, and a third clutch;
   said carrier and said second sun are couplable to one another for conjoint rotation by said first clutch;
   said carrier and said internal-combustion-engine input shaft are couplable to one another for conjoint rotation by said second clutch; and
   said second sun and said internal-combustion-engine input shaft are couplable to one another for conjoint rotation by said third clutch.

4. The transmission arrangement according to claim 1, wherein:
   said shiftable clutch arrangement includes a freewheel, said freewheel connects an engine-side section of said internal-combustion-engine input shaft and a transmission-side section of said internal-combustion-engine input shaft in a directionally selective manner; and
   said shiftable clutch arrangement includes two clutches, a first one of said two clutches couples said second sun and a second one of said two clutches couples said carrier, to said transmission-side section of said internal-combustion-engine input shaft in a shiftable manner.

5. The transmission arrangement according to claim 3, including:
   an auxiliary shaft, said carrier being connected to said auxiliary shaft, said brake and said shiftable clutch arrangement engaging on said auxiliary shaft;
   said first, said second, and said third clutch of said shiftable clutch arrangement being combined in a shiftable clutch unit with five shifting positions for coupling three gearshift shafts for conjoint rotation;
   in a first shifting position, a first one of said three gearshift shafts, namely said second sun, being coupled to a second one of said three gearshift shafts, namely said auxiliary shaft, for conjoint rotation;

in a second shifting position, said first one of said three gearshift shafts being coupled to a third one of said three gearshift shafts, namely said internal-combustion-engine input shaft, for conjoint rotation;

in a third shifting position, all three of said three gearshift shafts being coupled to one another for conjoint rotation;

in a fourth shifting position, a second one of said three gearshift shafts being coupled to said third one of said three gearshift shaft for conjoint rotation; and in a neutral position, said three gearshift shafts being uncoupled from one another within said shiftable clutch unit.

6. The transmission arrangement according to claim 5, wherein:

said shiftable clutch unit includes a sliding sleeve having an internal toothing with two axially spaced-apart axial regions;

said shiftable clutch unit includes toothed bodies with respective external toothings, said toothed bodies are provided fixedly on said gearshift shafts;

said first one and said third one of said three gearshift shafts are configured as hollow shafts and are spaced apart axially from one another, said second one of said three gearshift shafts passes coaxially through said first one and said third one of said three gearshift shafts; and the five shifting positions of said shiftable clutch unit are distinguished by different axial positions of said sliding sleeve, wherein said sliding sleeve is mounted in an axially displaceable manner and so as to be rotationally decoupled with respect to said transmission housing and, depending on a respective one of the shifting positions, by a toothed engagement of said internal toothing of said sliding sleeve in said external toothings of said toothed bodies interacts in a coupling manner with said toothed bodies for conjoint rotation.

7. The transmission arrangement according to claim 1, wherein:

said brake is a first brake; and a second brake is provided, said first sun is fixable on said transmission housing by said second brake.

8. The transmission arrangement according to claim 7, including:

an auxiliary shaft, said carrier being connected to said auxiliary shaft, said first brake and said shiftable clutch arrangement engaging on said auxiliary shaft;

said first and said second brake being combined in a shiftable brake unit with three shifting positions including a first shifting position, a second shifting position, and a neutral position for coupling two brake shafts to said transmission housing in a manner fixed against relative rotation;

in the first shifting position, said transmission housing being coupled, in a manner fixed against relative rotation, to a first one of said two brake shafts, namely said first sun;

in the second shifting position, said transmission housing being coupled to a second one of said two brake shafts, namely said auxiliary shaft, in a manner fixed against relative rotation; and in the neutral position, said transmission housing being coupled to neither of said two brake shafts in a manner fixed against relative rotation.

9. The transmission arrangement according to claim 8, including:

a hub, said two brake shafts being mounted on said hub and being disposed so as to pass through one another coaxially;

a sliding sleeve, said sliding sleeve being coupled fixed against relative rotation and in an axially displaceable manner to said transmission housing, said sliding sleeve reaching radially through said hub;

said sliding sleeve having an external toothing and an internal toothing;

said first one of said two brake shafts having an internal toothing and being configured as a hollow shaft;

said second one of said two brake shafts having an external toothing and being mounted within said first one of said two brake shafts; and the three shifting positions of said shiftable brake unit being distinguished by different axial positions of said sliding sleeve and, depending on respective ones of the shifting positions, through a toothed engagement of said external toothing of said sliding sleeve in said internal toothing of said first one of said two brake shafts, said sliding sleeve interacting in a coupling manner with said first one of said two brake shafts in a manner fixed against relative rotation, or through a toothed engagement of said internal toothing of said sliding sleeve in said external toothing of said second one of said two brake shafts, said sliding sleeve interacting in a coupling manner with said second one of said two brake shafts in a manner fixed against relative rotation, or said sliding sleeve not interacting in a coupling manner with either of said two brake shafts in a manner fixed against relative rotation.

10. The transmission arrangement according to claim 1, wherein said Ravigneaux gear set is disposed coaxially within said electric machine.

11. The transmission arrangement according to claim 1, wherein said internal-combustion-engine input shaft is configured to be connectable to a crankshaft of an internal combustion engine.

12. The transmission arrangement according to claim 1, wherein said output shaft is configured to be connectable to an output of a motor vehicle.

13. A drive train for a hybrid vehicle, comprising:

an internal combustion engine having a crankshaft;

an output having a driven shaft;

a transmission arrangement including a transmission housing;

said transmission arrangement including an electric machine provided in said transmission housing, said electric machine having a stator fixed relative to said transmission housing and a rotatably mounted rotor;

said transmission arrangement including an electric-motor input shaft connected to said rotor;

said transmission arrangement including an internal-combustion-engine input shaft connectable to said crankshaft of said internal combustion engine;

said transmission arrangement including an output shaft connectable to said output;

said transmission arrangement including a Ravigneaux gear set having a carrier, a set of long planets, a set of short planets, a ring gear, a first sun, and a second sun, said set of long planets and said set of short planets being mounted rotatably on said carrier, said short planets meshing with said long planets, said ring gear meshing with said short planets and being connected to said output shaft, said first sun meshing with said short planets and being connected to said electric-motor input shaft, said second sun meshing with said long planets;

said transmission arrangement including a brake, said carrier being fixable on said transmission housing by said brake;

said transmission arrangement including a shiftable clutch arrangement, said carrier, said second sun and said internal-combustion-engine input shaft being selectively couplable to one another in a torque-transmitting manner by said shiftable clutch arrangement;

said crankshaft of said internal combustion engine being connected to said internal-combustion-engine input shaft of said transmission arrangement; and said driven shaft of said output being connected to said output shaft of said transmission arrangement.

14. A hybrid vehicle, comprising:

a drive train having an internal combustion engine with a crankshaft;

said drive train having an output with a driven shaft;

said drive train having a transmission arrangement with a transmission housing;

said transmission arrangement including an electric machine provided in said transmission housing, said electric machine having a stator fixed relative to said transmission housing and a rotatably mounted rotor;

said transmission arrangement including an electric-motor input shaft connected to said rotor;

said transmission arrangement including an internal-combustion-engine input shaft connectable to said crankshaft of said internal combustion engine;

said transmission arrangement including an output shaft connectable to said output;

said transmission arrangement including a Ravigneaux gear set having a carrier, a set of long planets, a set of short planets, a ring gear, a first sun, and a second sun, said set of long planets and said set of short planets being mounted rotatably on said carrier, said short planets meshing with said long planets, said ring gear meshing with said short planets and being connected to said output shaft, said first sun meshing with said short planets and being connected to said electric-motor input shaft, said second sun meshing with said long planets;

said transmission arrangement including a brake, said carrier being fixable on said transmission housing by said brake;

said transmission arrangement including a shiftable clutch arrangement, said carrier, said second sun and said internal-combustion-engine input shaft being selectively couplable to one another in a torque-transmitting manner by said shiftable clutch arrangement;

said crankshaft of said internal combustion engine being connected to said internal-combustion-engine input shaft of said transmission arrangement; and said driven shaft of said output being connected to said output shaft of said transmission arrangement.

\* \* \* \* \*